US012469959B2

(12) United States Patent
Li et al.

(10) Patent No.: US 12,469,959 B2
(45) Date of Patent: Nov. 11, 2025

(54) FOLDABLE ELECTRONIC DEVICE AND ANTENNA SYSTEM FOR SAME

(71) Applicant: HONOR DEVICE CO., LTD., Shenzhen (CN)

(72) Inventors: Yuanpeng Li, Shenzhen (CN); Dawei Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/577,384

(22) PCT Filed: Aug. 22, 2022

(86) PCT No.: PCT/CN2022/114068
§ 371 (c)(1),
(2) Date: Jan. 8, 2024

(87) PCT Pub. No.: WO2023/116006
PCT Pub. Date: Jun. 29, 2023

(65) Prior Publication Data

US 2024/0250410 A1 Jul. 25, 2024

(30) Foreign Application Priority Data

Dec. 22, 2021 (CN) ......................... 202111582246.0

(51) Int. Cl.
*H01Q 1/24* (2006.01)
*H01Q 1/48* (2006.01)
*H01Q 1/52* (2006.01)

(52) U.S. Cl.
CPC ............... *H01Q 1/243* (2013.01); *H01Q 1/48* (2013.01); *H01Q 1/52* (2013.01)

(58) Field of Classification Search
CPC ........... H01Q 1/243; H01Q 1/48; H01Q 1/52; H01Q 5/378; H01Q 9/26; H01Q 9/42;
(Continued)

(56) References Cited

U.S. PATENT DOCUMENTS 10,283,864 B2 5/2019 Li et al.
10,290,922 B2 5/2019 Li et al.
(Continued)

FOREIGN PATENT DOCUMENTS

CN 104115331 A 10/2014
CN 104934706 A 9/2015
(Continued)

*Primary Examiner* — David E Lotter

(57) ABSTRACT

This application provides a foldable electronic device and an antenna system for same. The antenna system includes a main antenna element and a parasitic antenna element. The main antenna element includes a feed point and a first radiating branch disposed on a first body of the electronic device. The parasitic antenna element includes a second radiating branch disposed on a second body of the electronic device. In a folded state, the first radiating branch and the second radiating branch are at least partially overlapped. The first radiating branch is configured to perform magnetic field coupling with the second radiating branch, to form current loop radiation on both the first radiating branch and the second radiating branch, and a current direction in a current loop formed on the first radiating branch is the same as a current direction in a current loop formed on the second radiating branch.

19 Claims, 29 Drawing Sheets

(58) Field of Classification Search
CPC .......... H01Q 13/10; H01Q 1/36; H01Q 1/002; H01Q 1/2266; H01Q 1/273; H01Q 1/50
See application file for complete search history.

(56) References Cited

U.S. PATENT DOCUMENTS

| | | | | |
|---|---|---|---|---|
| 11,916,289 | B2 | 2/2024 | Chu et al. | |
| 2005/0190110 | A1 | 9/2005 | Taromaru et al. | |
| 2017/0077599 | A1 | 3/2017 | Sayama et al. | |
| 2021/0218137 | A1 | 7/2021 | Zhu | |
| 2021/0320402 | A1 | 10/2021 | Li | |
| 2022/0166132 | A1* | 5/2022 | Chu | H04B 1/0064 |
| 2024/0021998 | A1 | 1/2024 | Wang | |
| 2024/0380095 | A1* | 11/2024 | Wang | H01Q 5/385 |

FOREIGN PATENT DOCUMENTS

| | | | |
|---|---|---|---|
| CN | 109361062 | A | 2/2019 |
| CN | 210489828 | U | 5/2020 |
| CN | 112703460 | A | 4/2021 |
| CN | 112928456 | A | 6/2021 |
| DE | 102004046819 | A1 | 1/2006 |
| JP | 2015179938 | A | 10/2015 |
| WO | 2020187066 | A1 | 9/2020 |

* cited by examiner

| Main antenna element | Parasitic antenna element |
|---|---|
| Current loop slot antenna | Current loop slot antenna |
| Current loop left-handed antenna | Current loop left-handed antenna |
| Current loop monopole antenna | Current loop monopole antenna |
| Current loop dipole antenna | Current loop dipole antenna |
| Left-handed antenna | Left-handed antenna |

Current loop slot antenna (main antenna element) and current loop left-handed antenna (parasitic antenna element)

Current loop left-handed antenna (parasitic antenna element)

Current loop left-handed antenna (main antenna element) and current loop monopole antenna (parasitic antenna element)

FOLDABLE ELECTRONIC DEVICE AND ANTENNA SYSTEM FOR SAME

CROSS-REFERENCE TO RELATED APPLICATIONS

This application is a national stage of International Application No. PCT/CN2022/114068, filed on Aug. 22, 2022, which claims priority to Chinese Patent Application No. 202111582246.0, filed on Dec. 22, 2021. The disclosures of each of the aforementioned applications are hereby incorporated by reference in their entireties.

TECHNICAL FIELD

This application relates to the field of wireless communication technologies, and in particular to a foldable electronic device and an antenna system for same.

BACKGROUND

After electronic devices such as mobile phones enter a smart era, to obtain better user experience, appearances of the electronic devices have undergone changes from large screens to full screens and then to foldable screens. These foldable electronic devices have brought a new challenge to antenna design. When the electronic device is in a folded state and a gap is formed between two foldable bodies, there is a high-loss material with high resistivity and poor conductivity in the gap, such as an indium-tin oxide (Indium-Tin Oxide, ITO) layer contained in two foldable screens. Such high-loss material absorbs/consumes energy generated in the gap when an antenna is operating, resulting in a significant drop in efficiency of the antenna by 2 dB to 4 dB in a middle or low band relative to efficiency generated in an unfolded state of the electronic device. This causes poor antenna performance. Therefore, how to improve antenna performance in the folded state has become an important research topic in the field of antenna design.

SUMMARY

This application provides a foldable electronic device and an antenna system for same. The antenna system includes a main antenna element and a parasitic antenna element that are capable of performing current loop radiation, to improve antenna performance of the electronic device in a folded state.

According to a first aspect, this application provides an antenna system. The antenna system is used in a foldable electronic device. The foldable electronic device includes a first body and a second body that are connected to each other and are capable of being folded or unfolded relative to each other. The antenna system includes a main antenna element and a parasitic antenna element. The main antenna element includes a feed point and a first radiating branch disposed on the first body. The main antenna element is an antenna structure having a radiation characteristic of a current loop antenna. The feed point is used to feed the first radiating branch. The parasitic antenna element includes a second radiating branch disposed on the second body. When the electronic device is in a folded state, the first radiating branch and the second radiating branch are at least partially overlapped. The first radiating branch is configured to perform magnetic field coupling with the second radiating branch, to form current loop radiation on both the first radiating branch and the second radiating branch. A current direction in a current loop formed on the first radiating branch is the same as a current direction in a current loop formed on the second radiating branch.

The main antenna element and the parasitic antenna element that are opposite and that are of the antenna system are disposed on two foldable bodies of the electronic device respectively, and an antenna structure having a radiation characteristic of a current loop is used for both the main antenna element and parasitic antenna element. In the folded state, through magnetic field coupling between the main antenna element and the parasitic antenna element, current loop radiation is formed on both the first radiating branch and the second radiating branch, and currents in a same direction are excited on the radiating branches of the two antenna elements. Based on a characteristic of the current loop radiation, longitudinal currents in a same direction may be excited simultaneously on two overlapping grounding plates of a foldable grounding plate of the electronic device. In this manner, in one aspect, a reverse transverse current generated on the foldable grounding plate in a gap mode in the folded state may be suppressed by using the longitudinal currents in the same direction on the two overlapping grounding plates, to achieve a purpose of suppressing excitation of the gap mode and reducing or eliminating energy consumed in the folded state, and further increase antenna efficiency in the folded state; and in another aspect, excitation effect of the longitudinal mode of the foldable grounding plate is enhanced through superposition effect of the longitudinal currents in the same direction on the two overlapping grounding plates, to achieve a purpose of further increasing the antenna efficiency in the folded state, and enable the electronic device to obtain better antenna performance in the folded state, effectively resolving a problem of poor antenna efficiency in a low band of the foldable electronic device in the folded state.

In an implementation, the electronic device further includes a first reference ground corresponding to the first body and a second reference ground corresponding to the second body. When the electronic device is in the folded state, the main antenna element is configured to excite a closed current loop on the first radiating branch and the first reference ground, and is configured to perform magnetic field coupling with the parasitic antenna element, to excite a closed current loop on the second radiating branch and the second reference ground. The current direction on the first radiating branch is the same as the current direction on the second radiating branch. The current direction on the first radiating branch is opposite to a current direction on the first reference ground. The current direction on the second radiating branch is opposite to a current direction on the second reference ground. The current direction on the first reference ground is the same as the current direction on the second reference ground. Because longitudinal currents in a same direction are excited on an upper reference ground and a lower reference ground, of the foldable grounding plate of the electronic device, excitation effect of a longitudinal mode of the foldable grounding plate may be enhanced, to achieve a purpose of increasing antenna efficiency, suppress excitation of a gap mode of the foldable grounding plate, and reduce or eliminate energy consumed in the folded state, and further achieve a purpose of increasing antenna performance in the folded state.

In an implementation, the main antenna element and the parasitic antenna element are respectively any one of a current loop slot antenna, a current loop left-handed antenna, a current loop monopole antenna, a current loop dipole antenna, and a left-handed antenna. In this manner, there are at least 25 combination forms of the main antenna element and the parasitic antenna element. In specific application, based on an actual antenna design requirement for the foldable electronic device, various antenna combination forms may be flexibly used to increase the antenna efficiency of the electronic device in the folded state, to enable the electronic device to obtain good antenna performance in the folded state.

In an implementation, the electronic device further includes a connecting part disposed between the first body and the second body. The first body and the second body are connected through the connecting part. The first radiating branch is disposed at an edge, opposite to the connecting part, of the first body. The second radiating branch is disposed at an edge, opposite to the connecting part, of the second body.

In an implementation, the first radiating branch is disposed in a middle of an edge, opposite to the connecting part, of the first body. The second radiating branch is disposed in a middle of an edge, opposite to the connecting part, of the second body. In this manner, the antenna efficiency in the folded state may be further increased by using symmetry of a middle position, to enable the electronic device to obtain better antenna performance in the folded state.

In an implementation, the first radiating branch is coupled to the feed point. The first radiating branch is used to generate a current by exciting the feed point, and to perform radiation having a radiation characteristic of a current loop antenna. Alternatively, the main antenna element further includes a feed branch. The feed point is disposed on the feed branch. The feed branch and the first radiating branch are spaced apart. The feed branch couples energy to the first radiating branch through electric field coupling/magnetic field coupling, to excite the first radiating branch to perform current loop radiation. In specific application, based on an actual antenna design requirement for the foldable electronic device, different feeding forms may be used flexibly to implement feeding on the main antenna element.

In an implementation, the main antenna element and/or the parasitic antenna element is a current loop slot antenna. A radiating branch of the current loop slot antenna includes two radiators with opposite ends. The opposite ends of the two radiators are coupled through a first capacitor, and the other ends of the two radiators are respectively coupled to a corresponding reference ground. A gap is formed between the two radiators and the reference ground.

Alternatively, the main antenna element and/or the parasitic antenna element is a current loop monopole antenna. A radiating branch of the current loop monopole antenna includes one radiator. One end of the radiator is coupled to a corresponding reference ground or the feed point through a second capacitor, and the other end of the radiator is coupled to the corresponding reference ground through a third capacitor. A length of the radiating branch of the current loop monopole antenna is less than a quarter of an operating wavelength of the current loop monopole antenna.

Alternatively, the main antenna element and/or the parasitic antenna element is a current loop dipole antenna. A radiating branch of the current loop dipole antenna includes two radiators with opposite ends. The opposite ends of the two radiators are coupled through a first capacitor, the other end of one of the two radiators is coupled to a corresponding reference ground through a second capacitor, and the other end of the other of the two radiators is coupled to the corresponding reference ground through a third capacitor. A length of the radiating branch of the current loop dipole antenna is less than half of an operating wavelength of the current loop dipole antenna.

Alternatively, the main antenna element and/or the parasitic antenna element is a current loop left-handed antenna. A radiating branch of the current loop left-handed antenna includes two radiators with opposite ends. The opposite ends of the two radiators are coupled through a first capacitor, the other end of one of the two radiators is coupled to a corresponding reference ground or the feed point through a fourth capacitor, and the other end of the other of the two radiators is coupled to the corresponding reference ground.

Alternatively, the main antenna element and/or the parasitic antenna element are/is a left-handed antenna. A radiating branch of the left-handed antenna includes one radiator. One end of the radiator is coupled to a corresponding reference ground or the feed point through a fourth capacitor, and the other end of the radiator is coupled to the corresponding reference ground.

In an implementation, when an operating band of the main antenna element or the parasitic antenna element is 450 MHz to 1 GHz, a range of a capacitance value of the first capacitor is [2 pF, 25 pF].

When an operating band of the main antenna element or the parasitic antenna element is 1 GHz to 3 GHZ, a range of a capacitance value of the first capacitor is [0.8 pF, 12 pF].

When an operating band of the main antenna element or the parasitic antenna element is 3 GHz to 10 GHz, a range of a capacitance value of the first capacitor is [0.2 pF, 8 pF].

In an implementation, when an operating band of the main antenna element or the parasitic antenna element is 450 MHz to 1 GHZ, a range of capacitance values of the second capacitor and the third capacitor is [1.5 pF, 15 pF].

When an operating band of the main antenna element or the parasitic antenna element is 1 GHz to 3 GHZ, a range of capacitance values of the second capacitor and the third capacitor is [0.5 pF, 15 pF].

When an operating band of the main antenna element or the parasitic antenna element is 3 GHz to 10 GHZ, a range of capacitance values of the first capacitor and the second capacitor is [1.2 pF, 12 pF].

According to a second aspect, this application provides an antenna system. The antenna system is used in a foldable electronic device. The foldable electronic device includes a first body and a second body that are connected to each other and are capable of being folded or unfolded relative to each other. The antenna system includes a main antenna element and a parasitic antenna element. The main antenna element includes a feed point and a first radiating branch disposed on the first body. The feed point is used to feed the first radiating branch. The parasitic antenna element includes a second radiating branch disposed on the second body. When the electronic device is in a folded state, the first radiating branch and the second radiating branch are at least partially overlapped. The first radiating branch is configured to perform magnetic field coupling with the second radiating branch. The main antenna element is any one of a current loop slot antenna, a current loop left-handed antenna, a current loop monopole antenna, a current loop dipole antenna, and a left-handed antenna. The parasitic antenna element is any one of a current loop slot antenna, a current loop left-handed antenna, a current loop monopole antenna, a current loop dipole antenna, and a left-handed antenna.

For the current loop slot antenna, a radiating branch of the current loop slot antenna includes two radiators with opposite ends. The opposite ends of the two radiators are coupled through a first capacitor, and the other ends of the two radiators are respectively coupled to a reference ground. A gap is formed between the two radiators and the reference ground.

For the current loop monopole antenna, a radiating branch of the current loop monopole antenna includes one radiator. One end of the radiator is coupled to a reference ground or the feed point through a second capacitor, and the other end of the radiator is coupled to the reference ground through a third capacitor. A length of the radiating branch of the current loop monopole antenna is less than a quarter of an operating wavelength of the current loop monopole antenna.

For the current loop dipole antenna, a radiating branch of the current loop dipole antenna includes two radiators with opposite ends. The opposite ends of the two radiators are coupled through a first capacitor, the other end of one of the two radiators is coupled to a reference ground through a second capacitor, and the other end of the other of the two radiators is coupled to the reference ground through a third capacitor. A length of the radiating branch of the current loop dipole antenna is less than half of an operating wavelength of the current loop dipole antenna.

For the current loop left-handed antenna, a radiating branch of the current loop left-handed antenna includes two radiators with opposite ends. The opposite ends of the two radiators are coupled through a first capacitor, the other end of one of the two radiators is coupled to a reference ground or the feed point through a fourth capacitor, and the other end of the other of the two radiators is coupled to the reference ground.

For the left-handed antenna, a radiating branch of the left-handed antenna includes one radiator. One end of the radiator is coupled to a reference ground or the feed point through a fourth capacitor, and the other end of the radiator is coupled to the reference ground.

The main antenna element and parasitic antenna element that are opposite and that are of the antenna system are respectively disposed on two foldable bodies of the electronic device, and magnetic field coupling between the main antenna element and the parasitic antenna element is used in the folded state, to resolve a problem of poor antenna efficiency of the electronic device in the folded state. In the antenna system, there are at least 25 combination forms of the main antenna element and the parasitic antenna element. In specific application, based on an actual antenna design requirement for the foldable electronic device, various antenna combination forms may be flexibly used to increase the antenna efficiency of the electronic device in the folded state, to enable the electronic device to obtain good antenna performance in the folded state.

In an implementation, when the current loop slot antenna is used as the main antenna element,

- the opposite ends of the two radiators are respectively coupled to the feed point; or
- the current loop slot antenna further includes a feed branch, the feed branch and the radiating branch of the current loop slot antenna are spaced apart, the feed branch is disposed between the radiating branch of the current loop slot antenna and the reference ground, the feed point is disposed on the feed branch, and the feed branch is configured to perform coupled feeding on the radiating branch of the current loop slot antenna.

In an implementation, when the current loop left-handed antenna is used as the main antenna element,

- the other end of one of the radiators is coupled to the feed point through the fourth capacitor; or
- the current loop left-handed antenna further includes a feed branch, the feed branch and the radiating branch of the current loop left-handed antenna are spaced apart, the feed branch is disposed between the radiating branch of the current loop left-handed antenna and the reference ground, the feed point is disposed on the feed branch, and the feed branch is configured to perform coupled feeding on the radiating branch of the current loop left-handed antenna.

In an implementation, when the current loop monopole antenna is used as the main antenna element,

- the one end of the radiator is coupled to the feed point through the second capacitor; or
- the current loop monopole antenna further includes a feed branch, the feed branch and the radiating branch of the current loop monopole antenna are spaced apart, the feed branch is disposed between the radiating branch of the current loop monopole antenna and the reference ground, the feed point is disposed on the feed branch, and the feed branch is configured to perform coupled feeding on the radiating branch of the current loop monopole antenna.

In an implementation, when the current loop dipole antenna is used as the main antenna element,

- the opposite ends of the two radiators are respectively coupled to the feed point; or
- the current loop dipole antenna further includes a feed branch, the feed branch and the radiating branch of the current loop dipole antenna are spaced apart, the feed branch is disposed between the radiating branch of the current loop dipole antenna and the reference ground, the feed point is disposed on the feed branch, and the feed branch is configured to perform coupled feeding on the radiating branch of the current loop dipole antenna.

In an implementation, when the left-handed antenna is used as the main antenna element, one end of the radiator is coupled to the feed point through the fourth capacitor.

In an implementation, when an operating band of the main antenna element or the parasitic antenna element is 450 MHz to 1 GHz, a range of a capacitance value of the first capacitor is [2 pF, 25 pF].

When an operating band of the main antenna element or the parasitic antenna element is 1 GHz to 3 GHZ, a range of a capacitance value of the first capacitor is [0.8 pF, 12 pF].

When an operating band of the main antenna element or the parasitic antenna element is 3 GHz to 10 GHz, a range of a capacitance value of the first capacitor is [0.2 pF, 8 pF].

In an implementation, when an operating band of the main antenna element or the parasitic antenna element is 450 MHz to 1 GHz, a range of capacitance values of the second capacitor and the third capacitor is [1.5 pF, 15 pF].

When an operating band of the main antenna element or the parasitic antenna element is 1 GHz to 3 GHZ, a range of capacitance values of the second capacitor and the third capacitor is [0.5 pF, 15 pF].

When an operating band of the main antenna element or the parasitic antenna element is 3 GHz to 10 GHz, a range of capacitance values of the second capacitor and the third capacitor is [1.2 pF, 12 pF].

In an implementation, the electronic device further includes a connecting part disposed between the first body and the second body. The first body and the second body are connected through the connecting part.

The first radiating branch is disposed at an edge, opposite to the connecting part, of the first body. The second radiating branch is disposed at an edge, opposite to the connecting part, of the second body.

In an implementation, the first radiating branch is disposed in a middle of an edge, opposite to the connecting part, of the first body. The second radiating branch is disposed in a middle of an edge, opposite to the connecting part, of the second body.

According to a third aspect, this application provides a foldable electronic device. The foldable electronic device includes a first body, a second body, and the antenna system that is described in the first aspect or the second aspect. The first body and the second body are connected to each other and are capable of being folded or unfolded relative to each other. The main antenna element included in the antenna system is disposed on the first body, and the parasitic antenna element included in the antenna system is disposed on the second body.

In the foldable electronic device, the main antenna element and the parasitic antenna element that are opposite to each other are disposed on the two foldable bodies of the foldable electronic device, and the antenna structure having the radiation characteristic of a current loop antenna is used for both the main antenna element and the parasitic antenna element. In the folded state, through magnetic field coupling between the main antenna element and the parasitic antenna element, current loop radiation is formed on both the first radiating branch and the second radiating branch, and currents in a same direction are excited on the radiating branches of the two antenna elements. Based on a characteristic of the current loop radiation, longitudinal currents in a same direction may be excited simultaneously on two overlapping grounding plates of the foldable grounding plate of the electronic device. In this manner, in one aspect, a reverse transverse current generated on the foldable grounding plate in a gap mode in the folded state may be suppressed by using the longitudinal currents in the same direction on the two overlapping grounding plates, to achieve a purpose of suppressing excitation of the gap mode and reducing or eliminating energy consumed in the folded state, and further increase antenna efficiency in the folded state; and in another aspect, excitation effect of the longitudinal mode of the foldable grounding plate is enhanced through superposition effect of the longitudinal currents in the same direction on the two overlapping grounding plates, to achieve a purpose of further increasing the antenna efficiency in the folded state, and enable the electronic device to obtain better antenna performance in the folded state, effectively resolving a problem of poor antenna efficiency in a low band of the foldable electronic device in the folded state.

BRIEF DESCRIPTION OF DRAWINGS

To describe technical solutions in implementations of this application more clearly, the following briefly describes accompanying drawings to be used in the implementations of this application. Apparently, the accompanying drawings in the following description show merely some implementations of this application, and a person of ordinary skill in the art can derive another accompanying drawing from these accompanying drawings without creative efforts.

Reference numerals of main components

Figure 1:
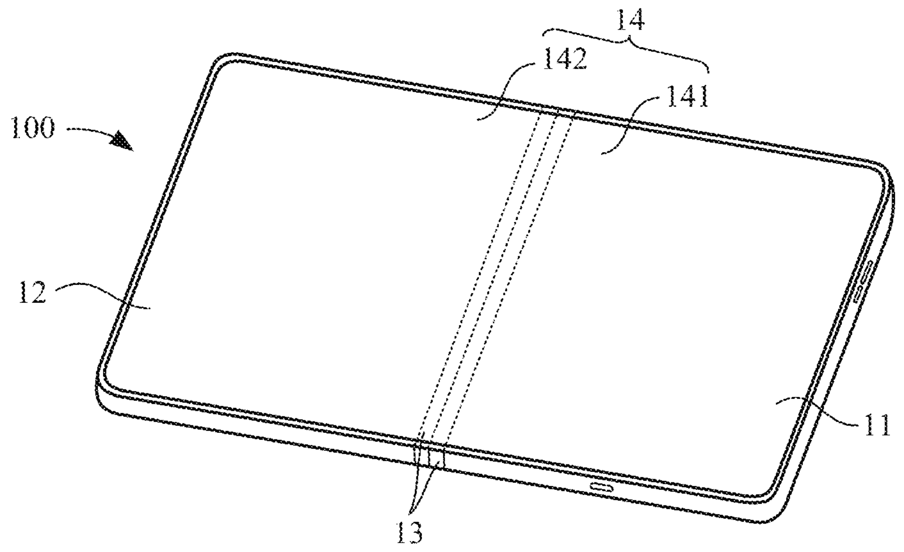
FIG. 1 is a schematic diagram of a structure of a foldable electronic device according to an implementation of this application, where the electronic device is in an unfolded state.

| | |
|---|---|
| Electronic device | 100 |
| First body | 11 |
| Second body | 12 |
| Connecting part | 13 |
| Display | 14 |
| First display | 141 |
| Second display | 142 |
| Antenna system | 200 |
| Antenna | 20 |
| Main antenna element | 21 |
| First radiating branch | 211 |
| Feed branch | 212 |
| First feed part | L01 |
| Second feed part | L02 |
| Parasitic antenna element | 22 |
| Second radiating branch | 221 |
| Radiators | L1, L2, L3, L4, L11, L12, L21, L22, L31, L41, L51, L52 |
| Feed point | P0 |
| First capacitor | C1 |
| Second capacitor | C2 |
| Third capacitor | C3 |
| Fourth capacitor | C0 |
| Gap | G0 |
| Another antenna element | 23 |
| Radio frequency module | 24 |
| Processor | 31 |
| Memory | 32 |
| Power supply module | 33 |
| Another input/output device | 34 |
| Housing | 40 |
| Middle frame | 41 |
| First middle frame | 411 |
| Second middle frame | 412 |
| Rear cover | 42 |
| First rear cover | 421 |
| Second rear cover | 422 |
| Internal component | 50 |
| First circuit board assembly | 511 |
| First battery cell | 512 |
| Second circuit board assembly | 521 |
| Second battery cell | 522 |
| Foldable grounding plate | 60 |
| First reference ground | 61 |
| Second reference ground | 62 |
| Edge region | A |
| Ordinary antenna | a |
| First edge region | B1 |
| Second edge region | B2 |

This application is further described with reference to the accompanying drawings in the following implementations.

DESCRIPTION OF EMBODIMENTS

The following clearly and completely describes technical solutions in implementations of this application with reference to accompanying drawings in the implementations of this application. The accompanying drawings are for illustrative purposes only, represent only schematic diagrams, and should not be construed as limiting this application. Apparently, described implementations are merely some but not all of implementations of this application. All other implementations obtained by a person of ordinary skill in the art based on the implementations of this application without creative efforts shall fall within the protection scope of this application.

Unless otherwise defined, all technical and scientific terms used in this application have same meanings as meanings usually understood by a person skilled in the art. Terms used in this specification of this application are merely for the purpose of describing specific implementations, and are not intended to limit this application.

This application provides a foldable electronic device. The electronic device includes a first body and a second body that may be folded or unfolded relative to each other, and an antenna system. The antenna system includes a main antenna element and a parasitic antenna element that are respectively disposed opposite to edge regions of two foldable bodies of the electronic device. In two modes, a longitudinal mode and gap mode, included in an eigenmode of a foldable grounding plate of the electronic device, an antenna structure having a radiation characteristic of a current loop antenna is used for both the main antenna element and the parasitic antenna element. In a folded state, through magnetic field coupling between the main antenna element and the parasitic antenna element, current loop radiation is formed on both radiating branches of the two antenna elements, and currents in a same direction are excited on the radiating branches of the two antenna elements. Based on a characteristic of the current loop radiation, longitudinal currents in a same direction may be excited simultaneously on two overlapping grounding plates of the foldable grounding plate of the electronic device. In this manner, in one aspect, a reverse transverse current generated on the foldable grounding plate in a gap mode in the folded state may be suppressed by using the longitudinal currents in the same direction on the two overlapping grounding plates, to achieve a purpose of suppressing excitation of the gap mode and reducing or eliminating energy consumed in the folded state, and further increase antenna efficiency in the folded state; in another aspect, excitation effect of the longitudinal mode of the foldable grounding plate is enhanced through superposition effect of the longitudinal currents in the same direction on the two overlapping grounding plates, to achieve a purpose of further increasing the antenna efficiency in the folded state, and enable the electronic device to obtain better antenna performance in the folded state, effectively resolving a problem of poor antenna efficiency in a low band of the foldable electronic device 100 in the folded state.

Figure 2:
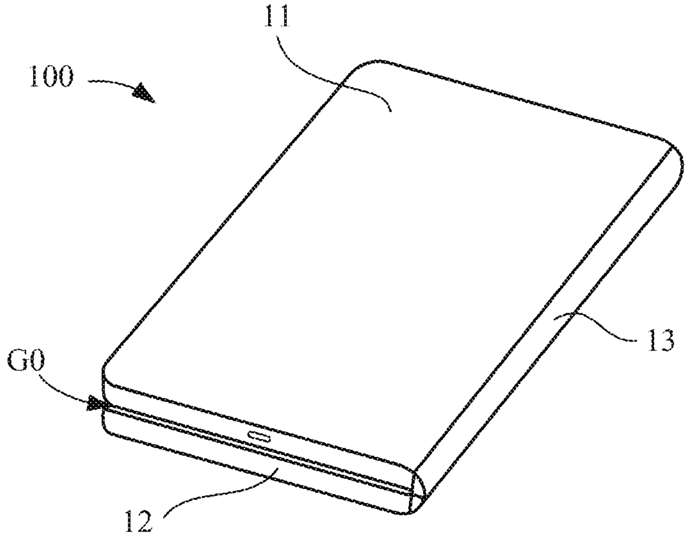
FIG. 2 is a schematic diagram of a structure of the electronic device shown in FIG. 1 in a folded state.

FIG. 1 and FIG. 2 show examples of schematic diagrams of structures of the foldable electronic device 100 according to implementations of this application. The electronic device 100 includes, but is not limited to, electronic apparatuses such as a mobile phone, a tablet computer, and a wearable device.

As shown in FIG. 1 and FIG. 2, the electronic device 100 includes a first body 11 and a second body 12 that are connected to each other. In the implementations, the electronic device 100 further includes a connecting part 13 disposed between the first body 11 and the second body 12. The first body 11 and the second body 12 are connected through the connecting part 13, and may be folded or unfolded relative to each other through the connecting part 13, to enable the electronic device 100 to have two use modes. FIG. 1 shows a schematic diagram of a structure of the electronic device 100 in a use mode in an unfolded state. FIG. 2 shows a schematic diagram of a structure of the electronic device 100 in a use mode in a folded state. As shown in FIG. 2, when the electronic device 100 is in the folded state, a gap G0 is formed between the first body 11 and the second body 12.

The electronic device 100 may also be provided with a connecting structure (not shown) on the connecting part 13 between the first body 11 and the second body 12, such as a rotating shaft or a hinge structure. The first body 11 and the second body 12 are connected through the connecting structure, and may be rotated through the connecting structure, to enable the first body 11 and the second body 12 to switch between a relatively folded state and a relatively unfolded state.

In the implementations, the electronic device 100 further includes a display 14 disposed on the first body 11 and the second body 12. The display 14 is used to display a visual output to a user. The visual output may include a graph, a text, an icon, a video, and the like. The display 14 may include a first display 141 and a second display 142. The first display 141 may be disposed on the first body 11, and the second display 142 may be disposed on the second body 12. Optionally, one of the first display 141 and the second display 142 may be set as a main screen, and the other display may be set as a secondary screen.

In an implementation, the first display 141 and the second display 142 may be coupled to each other, to enable the display 14 to be continuously disposed on a same side of the first body 11 and the second body 12. In this manner, the first display 141 and the second display 142 may form a complete plane when the electronic device 100 is fully unfolded. This enables the electronic device 100 to have a continuous large-area display when in the unfolded state, to achieve a function of displaying on a large screen, and to meet a requirement of the user for displaying on a large screen. The electronic device 100 has a small-area display when in a folded state, to meet a requirement of the user for ease of portability.

The display 14 may be a flexible screen. The display 14 may be hidden on an inner side of the electronic device 100 when the electronic device 100 is in the folded state, or may be exposed on an outer side of the electronic device 100. A type of the display 14 and a manner in which the display 14 is presented when the electronic device 100 is in the folded state are not limited in this application.

Figure 3:
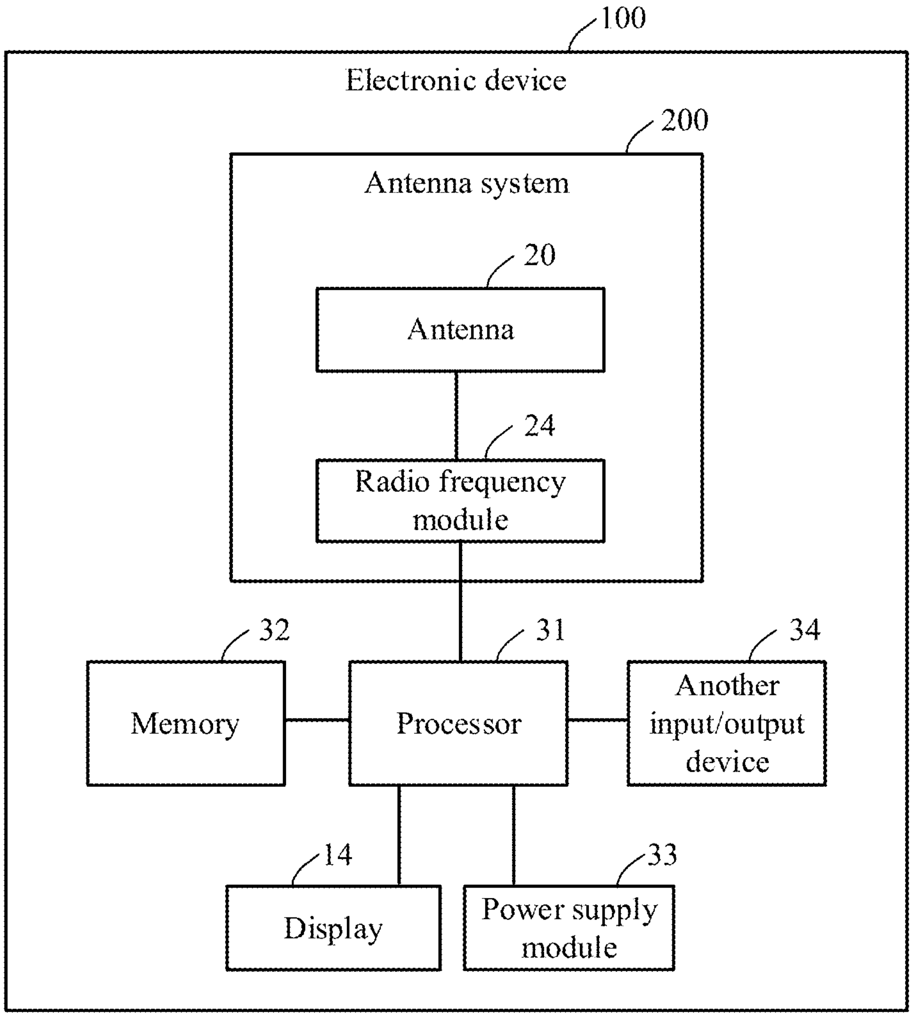
FIG. 3 is a schematic diagram of functional modules of the electronic device shown in FIG. 1, where the electronic device includes an antenna system.

FIG. 3 shows an example of a schematic diagram of functional modules of the electronic device 100. As shown in FIG. 3, in addition to the display 14, the electronic device 100 may further include a processor 31, a memory 32, a power supply module 33, and another input/output device 34.

The processor 31 serves as a logic operation and control center of the electronic device 100, and is mainly responsible for functions such as data collection, data conversion, data processing, logic operation, communication, and execution of drive output. The processor 31 may include a plurality of input/output ports. The processor 31 may communicate and exchange information with another functional module or external device through the plurality of input/output ports, to implement functions such as driving and control of the electronic device 100.

The memory 32 may be accessed by the processor 31 or a peripheral interface (not shown), to implement data storage, calling, or the like. The memory 32 may include a high-speed random access memory, and may also include a non-volatile memory, such as one or more magnetic disk storage devices, flash memory devices, or other volatile solid-state storage devices.

The power supply module 33 is configured to supply power to other functional modules of the electronic device 100 and perform power management, to enable the other functional modules of the electronic device 100 to operate normally.

The another input/output device 34 may include devices for implementing functions supported by the electronic device 100, such as a speaker, a touch pad, a camera, a function key, an I/O port, and the like, to implement interaction between the electronic device 100 and a user.

In this implementation, the electronic device 100 further has a wireless communication function. Correspondingly, the electronic device 100 further includes an antenna system 200, and the antenna system 200 includes at least an antenna 20 and a radio frequency module 24. The antenna 20 may be coupled to the radio frequency module 24 through a transmission element (not shown), such as a coaxial cable or a microstrip line, to implement wireless signal transmission, establishing communication between the electronic device 100 and another network device. In the electronic device 100, to meet a requirement of the user for using various wireless communication technologies, the antenna 20 usually includes a plurality of antenna elements. Each antenna element may be configured to cover a single or a plurality of communication bands. Different antenna elements may be multiplexed to increase a utilization rate of the antenna. The plurality of antenna elements may be distributed on the first body 11 and/or the second body 12, and there are various types of antennas, such as a monopole (monopole) antenna, a dipole (dipole) antenna, and an inverted F-shaped antenna (inverted F-shaped antenna, IFA).

It may be understood that the electronic device 100 may further include a circuit board assembly (not shown) disposed inside the first body 11 and/or the second body 12. The circuit board assembly is configured to dispose an electronic component included in the electronic device 100, such as the processor 31, the memory 32, and the radio frequency module 24. The circuit board assembly may be a flexible circuit board assembly or a rigid-flex circuit board assembly.

Figure 4:
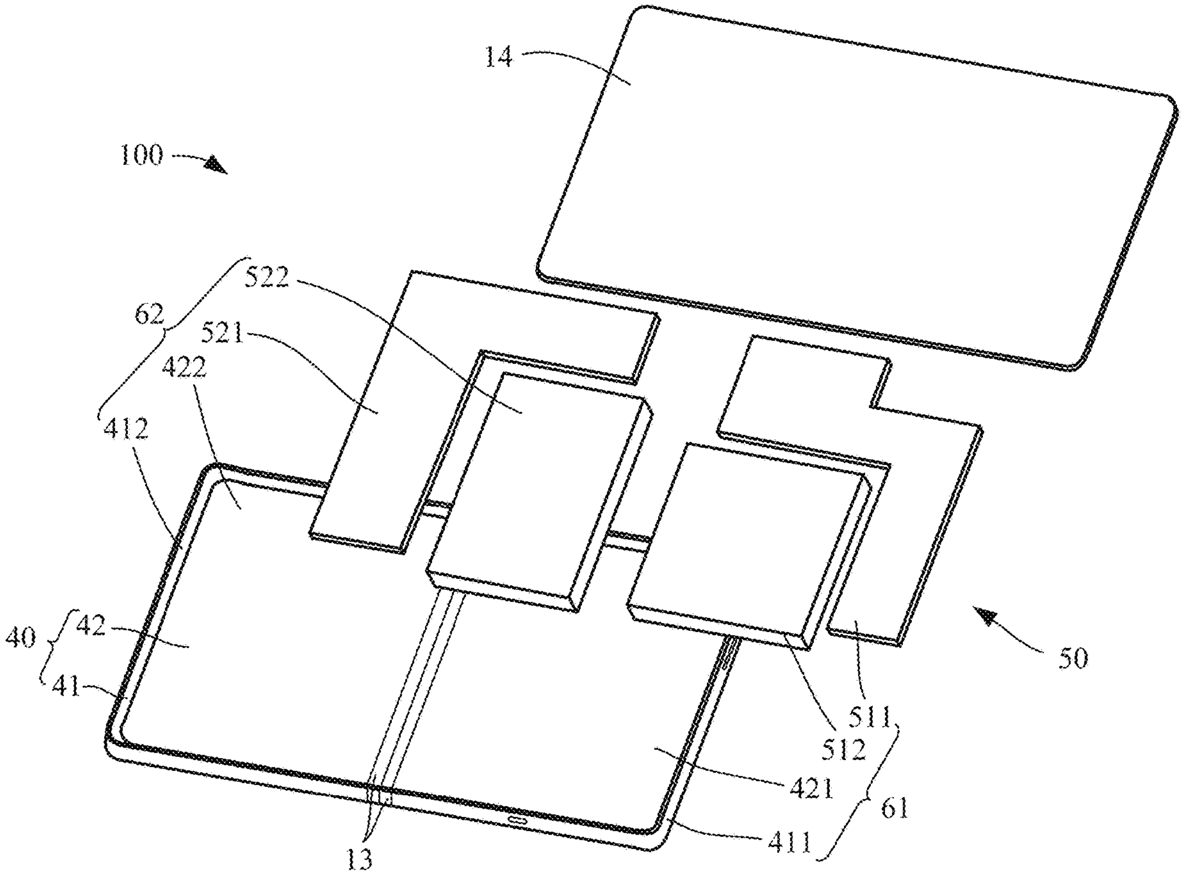
FIG. 4 is a schematic diagram of an exploded structure of the electronic device shown in FIG. 1.

FIG. 4 shows an example of a schematic diagram of an exploded structure of the electronic device 100. As shown in FIG. 4, the electronic device 100 includes at least a display 14, a housing 40, and an internal component 50 in an accommodating cavity surrounded by the display 14 and the housing 40.

Specifically, the housing 40 includes a middle frame 41 and a rear cover 42. The middle frame 41 is connected to at least one edge region of the rear cover 42. The middle frame 41 may be partially or entirely formed by a conductive structure (such as metal), or the middle frame 41 may be partially or entirely formed by a dielectric structure (such as plastic). The middle frame 41 includes a first middle frame 411 corresponding to the first body 11 and a second middle frame 412 corresponding to the second body 12. The first middle frame 411 and the second middle frame 412 are connected to each other.

The rear cover 42 may be formed by a conductive structure (such as metal) or a dielectric structure (such as glass). The rear cover 42 includes a first rear cover 421 corresponding to the first body 11 and a second rear cover 422 corresponding to the second body 12. The first rear cover 421 and the second rear cover 422 may be connected through the connecting part 13.

In this implementation, when the electronic device 100 is in the folded state, the first middle frame 411 and the second middle frame 412 are overlapped, and the first rear cover 421 and the second rear cover 422 are overlapped. The antenna 20 may be disposed on the middle frame 41 and/or the rear cover.

The internal component 50 accommodated in the accommodating cavity includes but is not limited to a first circuit board assembly 511 and a first battery cell 512 that are corresponding to the first body 11, and a second circuit board assembly 521 and a second battery cell 522 that are corresponding to the second body 12. The first circuit board assembly 511 is configured to dispose an electronic component included in the first body 11, and the second circuit board assembly 521 is configured to dispose an electronic component included in the second body 12. The first battery cell 512 and the second battery cell 522 are configured to provide power for electronic components disposed on the first body 11 and/or the second body 12. In another implementation, the electronic device 100 may further include one battery cell or more than two battery cells.

In this implementation, several metal components disposed on the first body 11, such as a part or all of a metal structure on the first middle frame 411, a part or all of a metal structure on the first rear cover 421, and several components with a metal conductive property included in the first circuit board assembly 511, the first battery cell 512, and the like may be coupled, and form a first reference ground 61 corresponding to the first body 11. Similarly, several metal components disposed on the second body 12, such as a part or all of a metal structure on the second middle frame 412, a part or all of a metal structure on the second rear cover 422, and several components with a metal conductive property included in the second circuit board assembly 521, the second battery cell 522, and the like may be coupled, and form a second reference ground 62 corresponding to the second body 12.

It should be noted that the first reference ground 61 and the second reference ground 62 in this application are not a complete metal grounding plate, but a combination of several coupled metal components. To facilitate illustration in a figure and facilitate understanding, the first reference ground 61 and the second reference ground 62 are represented as complete block equivalent structures with a specific thickness below. The first reference ground 61 and the second reference ground 62 may be coupled to each other.

It may be understood that the electronic device 100 shown in FIG. 3 and FIG. 4 is only an example of the electronic device, and the electronic device 100 may have more or fewer components than components shown in FIG. 3 and FIG. 4, may have a combination of two or more components, or may have a different component configuration.

Figure 5:
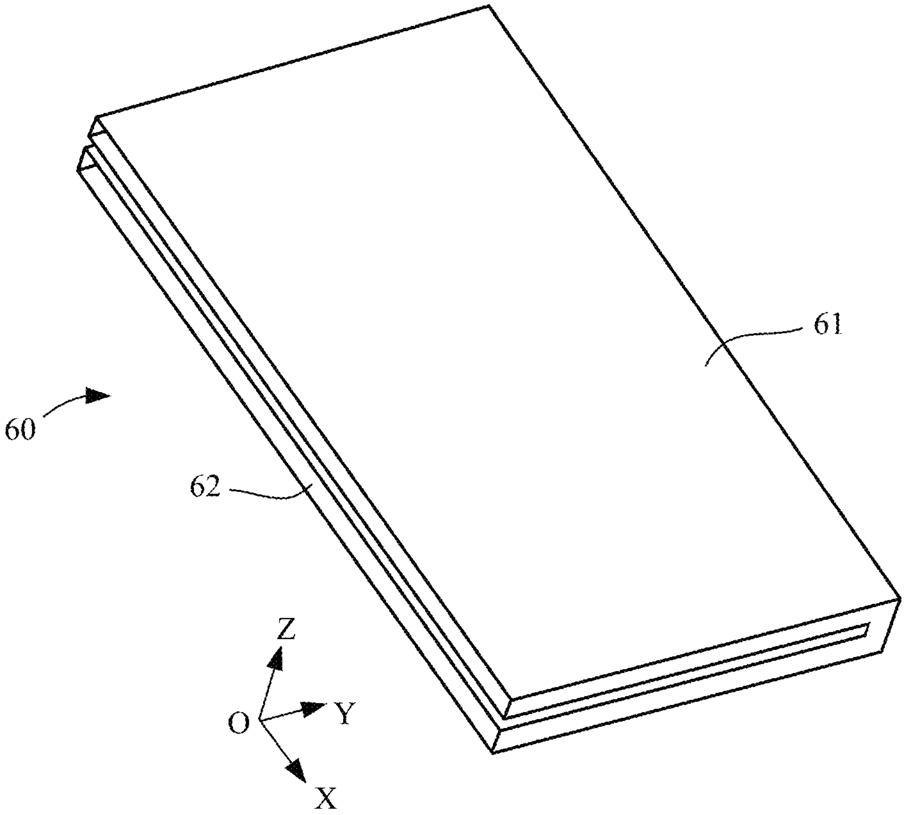
FIG. 5 is a schematic diagram of an equivalent structure of a foldable grounding plate of the electronic device shown in FIG. 2.

FIG. 5 shows a schematic diagram of an equivalent structure of the first reference ground 61 and the second reference ground 62. It may be understood that, when the electronic device 100 is in the unfolded state, the electronic device 100 has a large-area single grounding plate (not shown) formed by the first reference ground 61 and the second reference ground 62 that are distributed continuously. When the electronic device 100 is in the folded state, the electronic device 100 has a small-area foldable grounding plate 60 formed by overlapping the first reference ground 61 and the second reference ground 62.

During use of the electronic device 100, the inventor finds that antenna efficiency of the electronic device 100 differs greatly in two basic states, the unfolded state and folded state. Compared with antenna efficiency in the unfolded state, antenna efficiency of the electronic device 100 in the folded state is obviously poor. The difference is more obvious in a low band, and antenna efficiency in a low band in the folded state is approximately 2 dB to 4 dB less than the antenna efficiency in a low band in the unfolded state. To analyze a reason why the antenna efficiency in the folded state is reduced, and to increase the antenna efficiency corresponding to the folded state, the inventor has conducted a lot of research and analysis.

It may be learned from an eigenmode of the grounding plate of the electronic device 100 analyzed through a simulated experiment that, when the electronic device 100 is in the unfolded state, the eigenmode of the large-area single grounding plate of the electronic device 100 in the low band is a longitudinal mode. When the electronic device 100 is in the folded state, the eigenmode of the small-area foldable grounding plate 60 of the electronic device 100 in the low band is represented as the longitudinal mode and a gap mode. It should be noted that the eigenmode is an inherent resonance mode of a metal body without any excitation, and is not related to an antenna, and whether the eigenmode of the metal body may be excited, and excitation effect of the eigenmode depend on design of the antenna on the metal body.

Figure 6A:
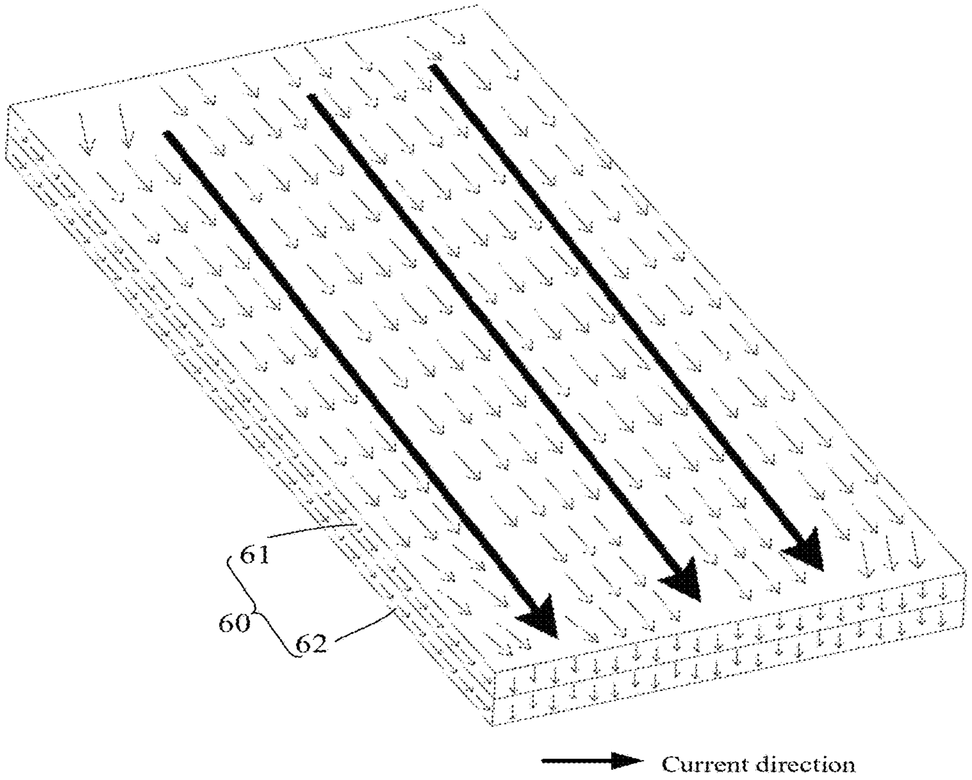
FIG. 6A is a schematic diagram of simulation of current distribution generated when a longitudinal mode of the foldable grounding plate shown in FIG. 5 is excited.
Figure 6B:
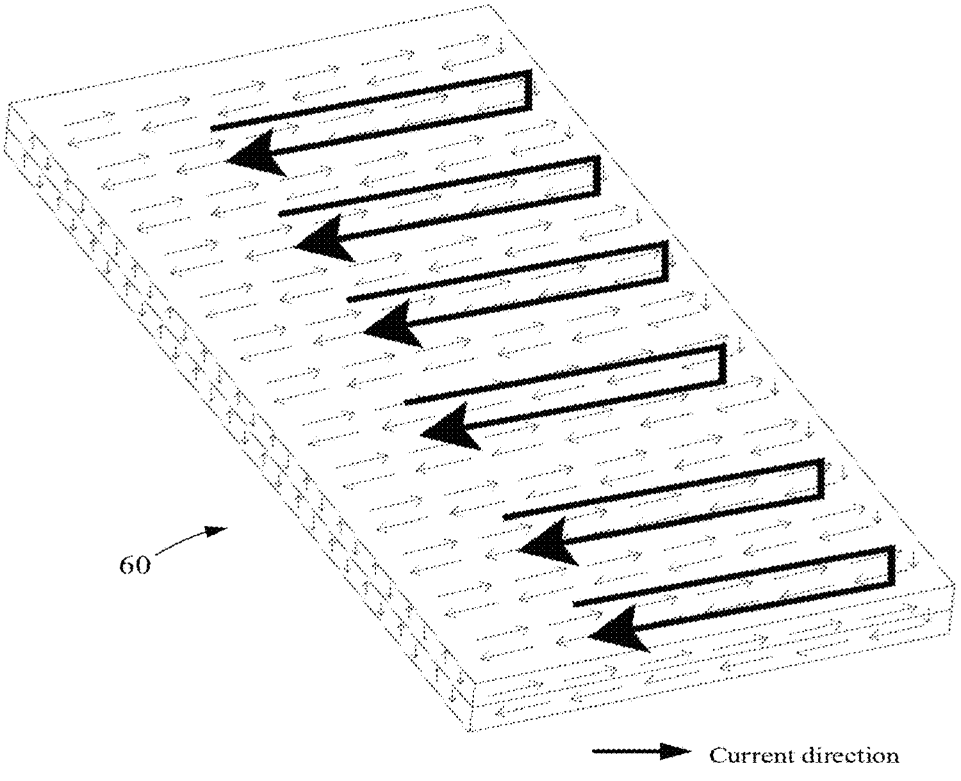
FIG. 6B is a schematic diagram of simulation of current distribution generated when a gap mode of the foldable grounding plate shown in FIG. 5 is excited.

FIG. 6A and FIG. 6B show schematic diagrams of simulation of current distribution when two eigenmodes of the foldable grounding plate 60 of the electronic device 100 in a low band are excited. FIG. 6A shows a schematic diagram of simulation of current distribution when a longitudinal mode of the foldable grounding plate 60 is excited. Longitudinal distribution of currents on two metal body grounding plates of the foldable grounding plate 60, namely, outer surfaces of the first reference ground 61 and the second reference ground 62 along the foldable grounding plate 60, forms "longitudinal currents". FIG. 6B shows a schematic diagram of simulation of current distribution when a gap mode of the foldable grounding plate 60 is excited. Transverse distribution of currents on inner surfaces of two grounding plates of the foldable grounding plate 60 along the foldable grounding plate 60 form "transverse currents", and directions of the transverse currents on the two grounding plates are opposite.

Based on simulation results shown in FIG. 6A and FIG. 6B, a conventional antenna solution is used to excite the eigenmode of the foldable grounding plate 60 of the electronic device 100, and a principle of an electric field and a current generated on the foldable grounding plate 60 is analyzed.

Figure 7:
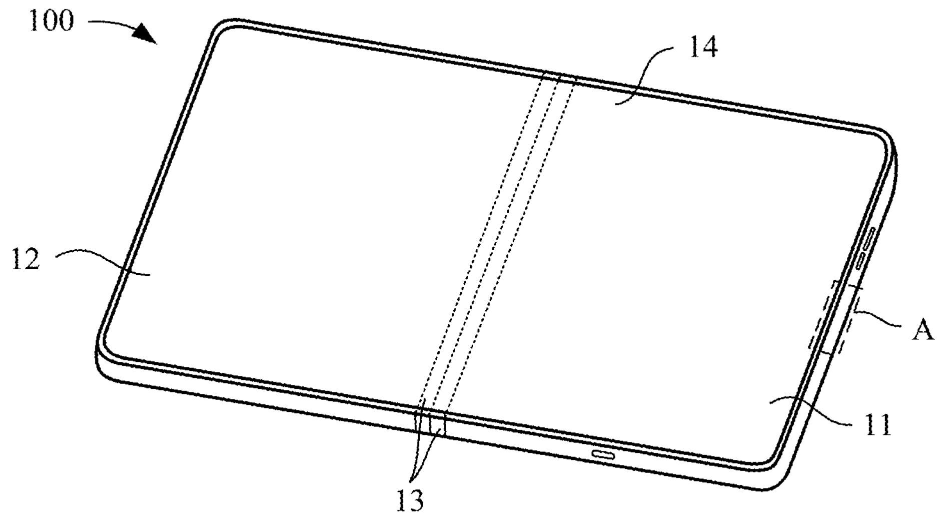
FIG. 7 is a schematic diagram of a position at which an ordinary antenna is disposed in an electronic device in a conventional antenna solution.
Figure 8:
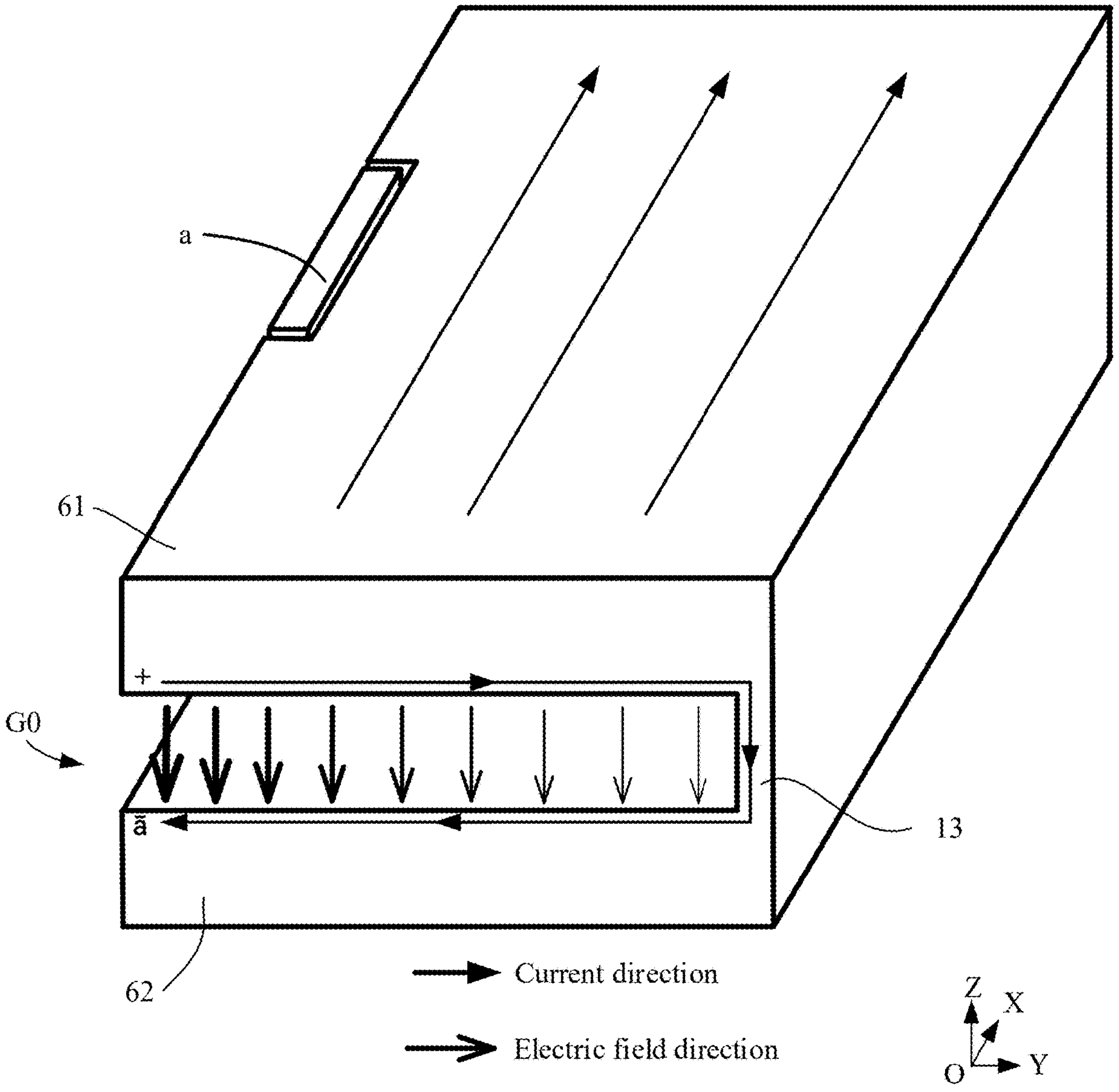
FIG. 8 is a schematic diagram of a principle of current distribution generated by exciting an eigenmode of the foldable grounding plate shown in FIG. 5 by using a conventional antenna solution.

In a conventional antenna solution, an ordinary antenna a is disposed at an edge of a body of the electronic device 100. For example, as shown in FIG. 7 and FIG. 8, an ordinary IFA is disposed in an edge region A, opposite to the connecting part 13, of the first body 11 of the electronic device 100. In this manner, the ordinary antenna a is adjacent to an edge of the first reference ground 61, or the ordinary antenna a is located at the edge of the first reference ground 61, and a radiating branch of the ordinary antenna a is disposed in a longitudinal direction of the first reference ground 61.

As shown in FIG. 8, when the electronic device 100 is in the folded state, an upper metal body grounding plate and a lower metal body grounding plate of the foldable grounding plate 60, namely, the first reference ground 61 and the second reference ground 62, are overlapped. In other words, a flat plate capacitor is formed. When the ordinary antenna a is excited, an electric field is coupled in a gap G0 between the upper grounding plate and lower grounding plate, and a direction of the electric field is from one grounding plate to the other grounding plate. An electric field strength close to the ordinary antenna a is higher than an electric field strength close to the connecting part 13, and transverse currents in opposite directions are induced on inner surfaces, close to the gap G0, of the upper grounding plate and lower grounding plate.

This may be understood as follows. When the ordinary antenna a is excited, a current is induced on the upper grounding plate, to enable the upper grounding plate to be positively or negatively charged. When the upper grounding plate and lower grounding plate of the foldable grounding plate 60 are close to each other, at a specific time point, if the upper grounding plate is positively charged, negative charges are induced on the lower grounding plate, and a voltage difference is formed between the two overlapping grounding plates. Therefore, the electric field is generated in the gap G0 between the two overlapping grounding plates. The upper grounding plate and lower grounding plate are coupled through the connecting part 13, and currents are induced on the inner surfaces, close to the gap G0, of the upper grounding plate and lower grounding plate, and a distribution direction of a current on the upper grounding plate and a distribution direction of a current on the lower grounding plate are opposite to each other.

Because the upper grounding plate and lower grounding plate of the foldable grounding plate 60 have a specific thickness, and the thickness is usually far greater than a distance of the gap G0, currents induced in the gap G0 mainly crowd in the inner surfaces, close to the gap G0, of the upper grounding plate and lower grounding plate. This may be understood as follows. Due to existence of the flat plate capacitor, the currents induced in the gap G0 mainly crowd in the inner surfaces, close to the gap G0, of the upper grounding plate and lower grounding plate. To be specific, a "transverse current" or "gap current" in the gap mode is formed.

In addition, the currents in the longitudinal mode excited on the upper grounding plate and lower grounding plate mainly crowd in the outer surfaces of the upper grounding plate and lower grounding plate, and are distributed in a longitudinal direction of the two grounding plates. To be specific, the "longitudinal currents" in the longitudinal mode are formed. Current distribution and electric field distribution in the longitudinal mode of the foldable grounding plate 60 are similar to current distribution and electric field distribution in the longitudinal mode of a single grounding plate in the unfolded state.

Based on the foregoing analysis of the simulation results of current distribution and a principle of current generation in the eigenmode of the grounding plate of the foldable electronic device 100, it may be learned that a gap mode is included in the eigenmode of the foldable grounding plate 60 compared with the single grounding plate in the unfolded state. In this manner, for the foldable electronic device 100, a reason why the antenna efficiency in the folded state is significantly less than the antenna efficiency in the unfolded state should be related to excitation of the gap mode of the foldable grounding plate 60.

Through research, it is found that in the folded state, when the gap mode is excited, energy generated in the gap G0 is consumed/absorbed by a high-loss material located in the gap G0, causing antenna efficiency in the gap mode to be obviously reduced, and affecting antenna radiation effect.

Figure 9:
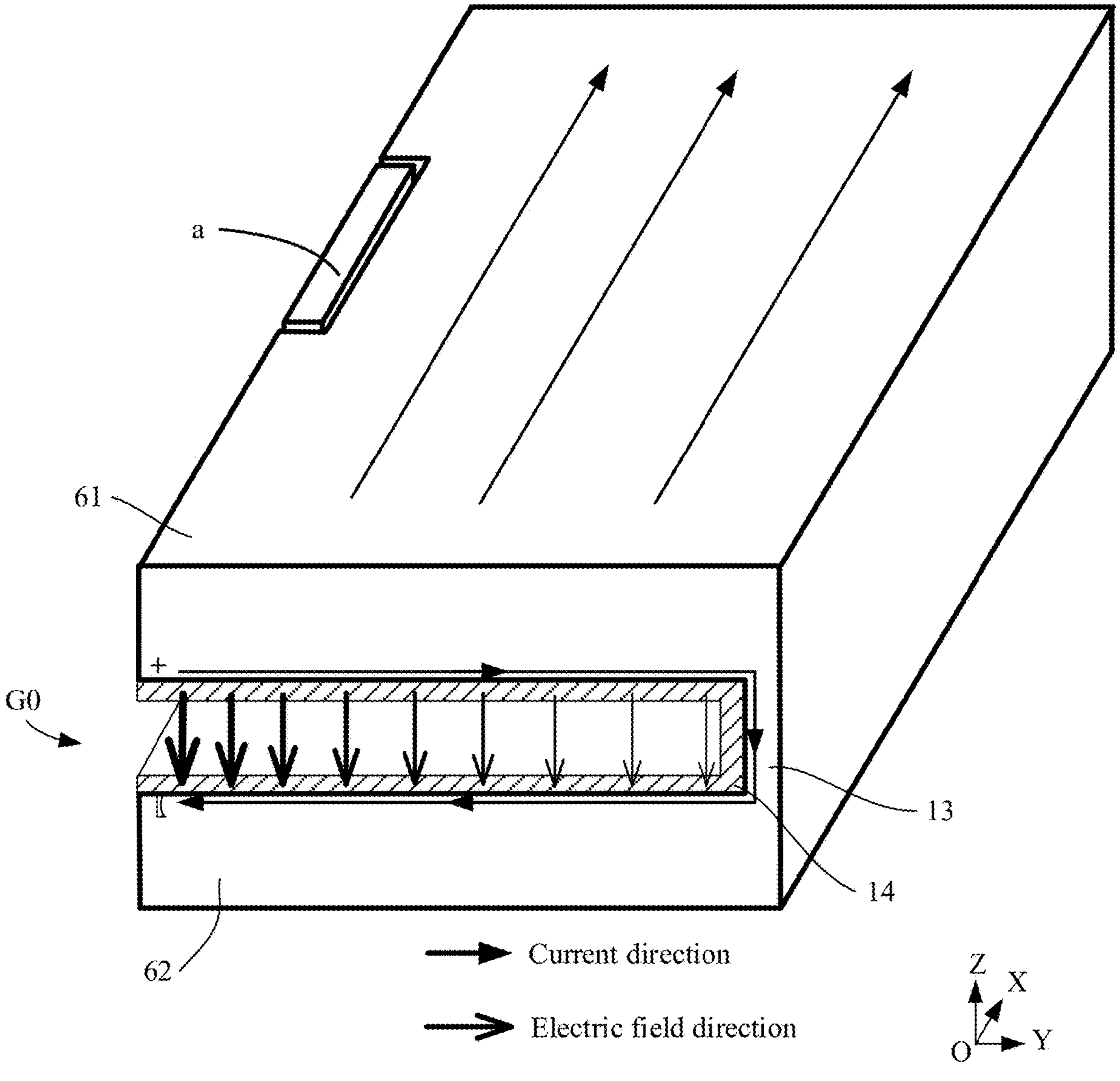
FIG. 9 is a schematic diagram of a principle of current distribution generated by exciting an eigenmode of the foldable grounding plate shown in FIG. 5 by using a conventional antenna solution, where a display of the electronic device is folded in a gap between the foldable grounding plates.

Specifically, in the folded state, there is a high-loss material with high resistivity and poor conductivity in the gap G0. For example, in the folded state, if the display 14 is hidden on an inner side of the electronic device 100, an ITO layer and the like included in the display 14 provide the high-loss material in the gap G0. If the display 14 is exposed on an outer side of the electronic device 100, and a glass rear cover of the electronic device 100 is hidden on the inner side of the electronic device 100, a glass layer included in the glass rear cover also provides the high-loss material in the gap G0. As shown in FIG. 9, in this application, taking the display 14 hidden in the inner side of the electronic device 100 as an example, a reason why the antenna efficiency of the electronic device 100 in the folded state is reduced is analyzed.

As described above, when the ordinary antenna a is excited, an electric field is coupled in the gap G0 between the upper grounding plate and lower grounding plate, and transverse currents in opposite directions are induced on the inner surfaces, close to the gap G0, of the upper grounding plate and lower grounding plate. Because the display 14 is disposed in the gap G0 and is attached to the inner surfaces of the upper grounding plate and lower grounding plate, after meeting a high-loss material, namely, a dielectric with resistivity, included in the display 14, currents induced on the inner surfaces of the upper grounding plate and lower grounding plate are absorbed or consumed by the high-loss material. This may be understood as follows. The high-loss material is added to the gap G0, and in closed space of the gap G0, the electric field passes the high-loss material, to enable energy of the electric field to be absorbed or consumed by the high-loss material.

It may be learned from the foregoing analysis that, when the eigenmode of the foldable grounding plate 60 is excited, as more currents are excited in the gap mode, more energy is consumed in the gap mode. Consequently, the antenna efficiency in the folded state is significantly less than the antenna efficiency in the unfolded state.

In addition, as described above, when the ordinary antenna a is excited, longitudinal currents in the longitudinal mode excited on the upper grounding plate and lower grounding plate mainly crowd in the outer surfaces of the upper grounding plate and lower grounding plate. Therefore, the longitudinal currents are not absorbed by the high-loss material in the gap G0. It may be learned that excitation of the longitudinal mode is not a reason for poor antenna efficiency in the folded state, and the longitudinal mode may be utilized for antenna radiation.

Because longitudinal currents are generated on both the first reference ground 61 and the second reference ground 62 of the foldable grounding plate 60 in the longitudinal mode, and longitudinal currents in opposite directions are respectively generated in the first reference ground 61 and the second reference ground 62 of the foldable grounding plate 60 in the gap mode, as shown in FIG. 9, a direction of the longitudinal current generated on the foldable grounding plate 60 in the longitudinal mode and a direction of the transverse current generated on the foldable grounding plate 60 in the gap mode are orthogonal. It may be learned that the two modes, the longitudinal mode and the gap mode, are incompatible. In this manner, when the eigenmode of the foldable grounding plate 60 is excited, if the gap mode is excited more intensely at a same time point, the longitudinal mode is excited less intensely, leading to poor antenna efficiency in the folded state.

It may be learned that, to increase the antenna efficiency in the folded state, one key point is to suppress excitation of the gap mode of the foldable grounding plate 60 and reduce or eliminate energy consumed in the folded state.

Figure 10:
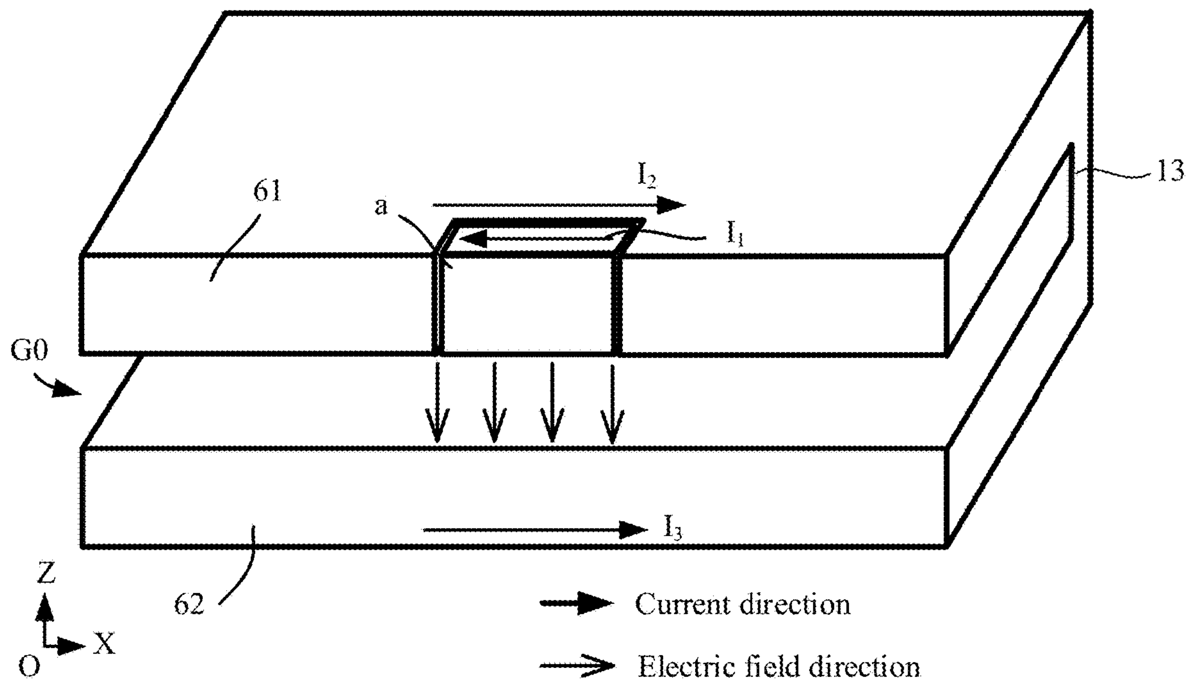
FIG. 10 is a schematic diagram of a principle of current distribution generated at an edge position on the foldable grounding plate by exciting an eigenmode of the foldable grounding plate shown in FIG. 5 by using a conventional antenna solution.

Refer to FIG. 10. In the foregoing conventional antenna solution, because the ordinary antenna a is disposed only at an edge of one (for example, the first body 11) of bodies of the electronic device 100, when the ordinary antenna a is excited to generate a current I1, as described above, an electric field is coupled in the gap G0 between the upper grounding plate and lower grounding plate, and a direction of the electric field is from one grounding plate to the other. At an edge position at which the upper grounding plate and lower grounding plate are opposite to the connecting part 13, as shown in FIG. 10, a current I1 generated by exciting the ordinary antenna a is distributed in the longitudinal direction of the first reference ground 61, the ordinary antenna a is coupled to the first reference ground 61 through an electric field, and a reverse current I2 distributed in the longitudinal direction of the first reference ground 61 is induced on the first reference ground 61 near the ordinary antenna a. Because no resonant unit is disposed on the other body (such as the second body 12), the ordinary antenna a is coupled to the second reference ground 62 through the electric field, and a reversely distributed longitudinal current I3 is induced near a position, corresponding to the ordinary antenna a, of the second reference ground 62.

It may be learned from FIG. 10 that both the longitudinal mode of the first reference ground 61 and the longitudinal mode of the second reference ground 62 of the foldable grounding plate 60 may generate longitudinal currents in a same direction. However, if the ordinary antenna a is disposed on only one, such as the first body 11, of the bodies as in the conventional antenna solution, to excite the longitudinal current of the first reference ground 61. In the folded state, for the second reference ground 62, because no resonant unit is disposed on the second reference ground 62, the second reference ground 62 is entirely passively coupled. In this manner, the longitudinal mode of the second reference ground 62 is excited by a current, coupled from the ordinary antenna a to the second reference ground 62, and excitation effect of the longitudinal mode of the second reference ground 62 is not significant. Therefore, a longitudinal current excited on the second reference ground 62 is relatively weak.

It may be learned that, to increase the antenna efficiency in the folded state, another key point is to enhance excitation of longitudinal currents in a same direction of the upper reference ground and lower reference ground of the foldable grounding plate 60.

Figure 11A:
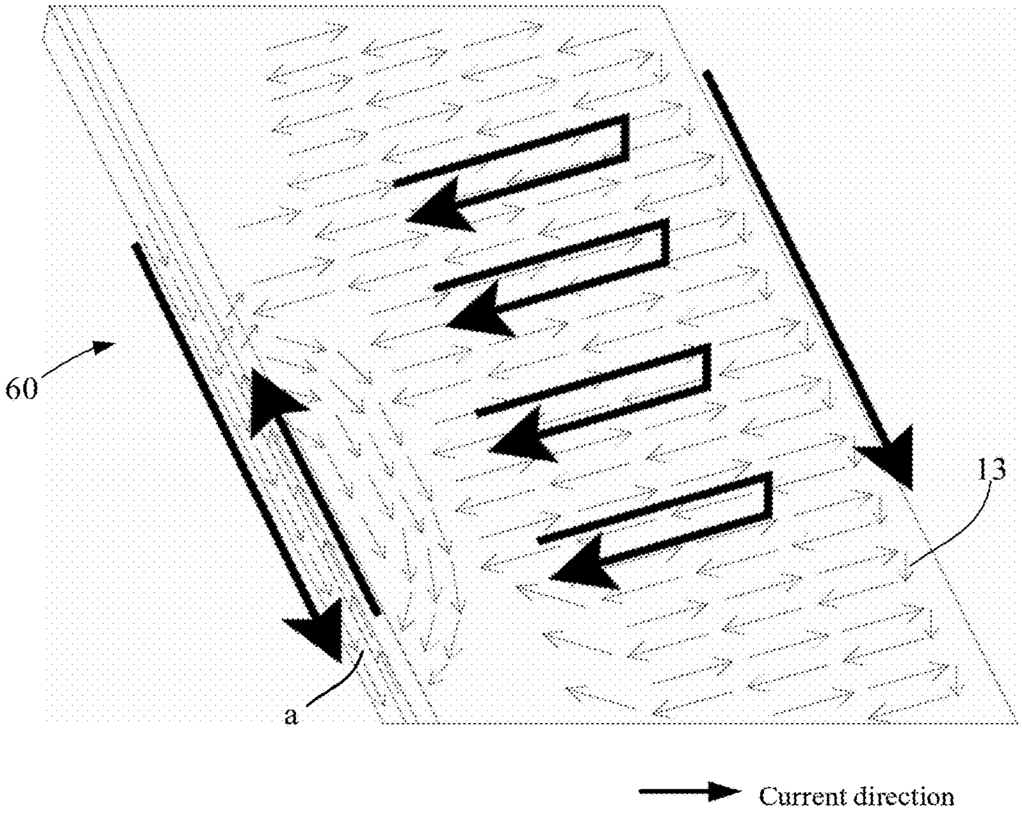
FIG. 11A is a schematic diagram of simulation of current distribution corresponding to an eigenmode that is of a foldable grounding plate of the electronic device and that is obtained by exciting an ordinary antenna during operation in a conventional antenna solution.

Based on the foregoing analysis, the inventor also performs simulated verification on the current distribution and magnetic field distribution corresponding to the eigenmode of the foldable grounding plate 60 of the electronic device 100 in the foregoing conventional antenna solution. FIG. 11A shows a schematic diagram of simulation of current distribution corresponding to an eigenmode of the foldable grounding plate 60 obtained by exciting the ordinary antenna a during operation. As shown in FIG. 11A, when the ordinary antenna a is operating, the gap mode is excited apart from the longitudinal mode on the foldable grounding plate 60. In addition, the longitudinal current may be obtained by exciting the ordinary antenna a only near a position of the ordinary antenna a and on the connecting part 13, but a current excited on the overlapping grounding plate near the connecting part 13 is still a transverse current.

Figure 11B:
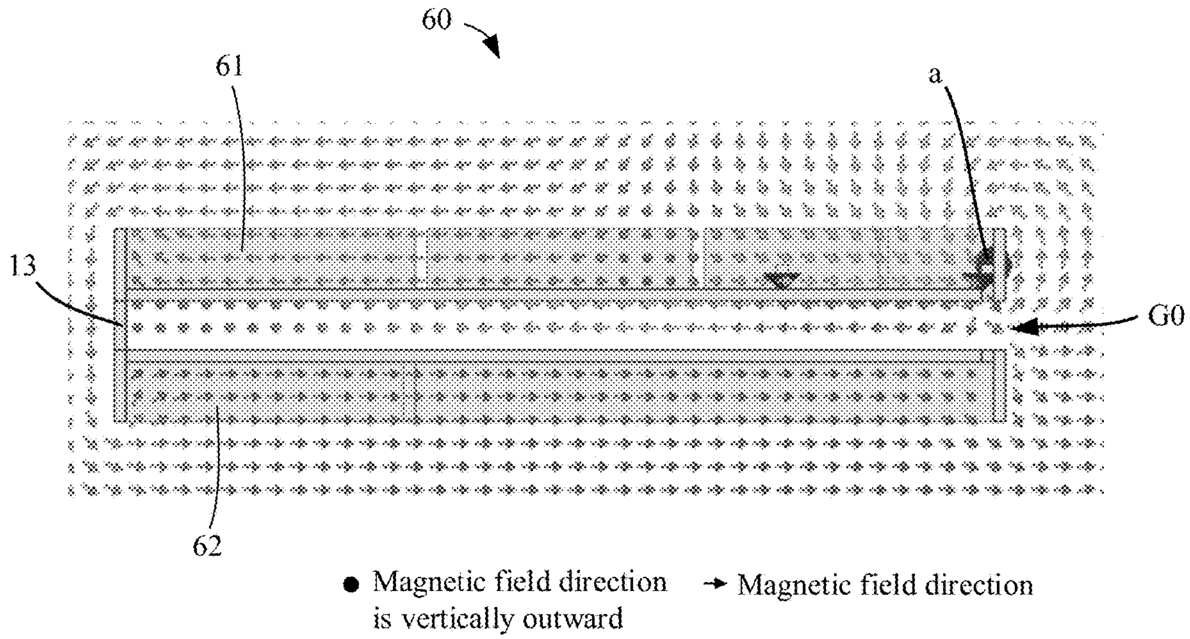
FIG. 11B is a schematic diagram of simulation of magnetic field distribution corresponding to an eigenmode that is of a foldable grounding plate of the electronic device and that is obtained by exciting an ordinary antenna during operation in a conventional antenna solution.

FIG. 11B shows a schematic diagram of simulation of magnetic field distribution corresponding to an eigenmode of the foldable grounding plate 60 obtained by exciting the ordinary antenna a during operation. As shown in FIG. 11B, when the ordinary antenna a is operating, a magnetic field distributed in space (that is, at an edge on a right side of the first reference ground 61 shown in FIG. 11B) near an outer side of a position of the ordinary antenna a and in space near an outer side of the connecting part 13 are both parallel to an end surface (that is, a right end of the first reference ground 61 shown in FIG. 11B) of the first reference ground 61. With reference to the Ampere's law (right hand spiral rule), it may be learned that a position of the ordinary antenna a and a current on the connecting part 13 are both distributed in a longitudinal direction of the foldable grounding plate 60. In the gap G0, magnetic field distribution near the connecting part 13 on a left side of the foldable grounding plate 60 is normal to a screen (that is, a direction of the magnetic field is vertically outward and pointing to a direction of a reader), it indicates that a current near the connecting part 13 on a left side of the foldable grounding plate 60 is distributed in a transverse direction of the foldable grounding plate 60. To be specific, current distribution near the connecting part 13 on a left side of the foldable grounding plate 60 is still in the gap mode.

With reference to a simulation result of current distribution shown in FIG. 11A and a simulation result of the magnetic field distribution shown in FIG. 11B, it may be learned that effect of exciting the longitudinal mode of the foldable grounding plate 60 by the ordinary antenna a is poor, and it is difficult to suppress excitation of the gap mode of the foldable grounding plate 60. A relatively intense gap mode is excited just because this conventional antenna solution is used for the electronic device 100, leading to significant reduction of the antenna efficiency in the folded state.

Through hard research and analysis by the inventor and a large quantity of simulation results of experimental data, it is found that the main antenna element and the parasitic antenna element are respectively disposed at edges of the two bodies of the electronic device 100, and both the main antenna element and the parasitic antenna element use an antenna structure having a radiation characteristic of a current loop antenna, the main antenna element and the parasitic antenna element are used for magnetic field coupling, current loop radiation is formed on radiating branches of the two antenna elements respectively, and currents in a same direction are excited on the radiating branches of the two antenna elements respectively. In this manner, longitudinal currents in a same direction may be excited on the upper reference ground and lower reference ground of the foldable grounding plate 60. This may enhance excitation effect of the longitudinal mode, suppress excitation of the gap mode, and reduce or eliminate energy consumed in the folded state, achieving a purpose of improving antenna performance in the folded state. When a radiation characteristic of the current loop antenna is that there is an even magnetic field near a radiating branch of the antenna element when the antenna element is operating.

Figure 12:
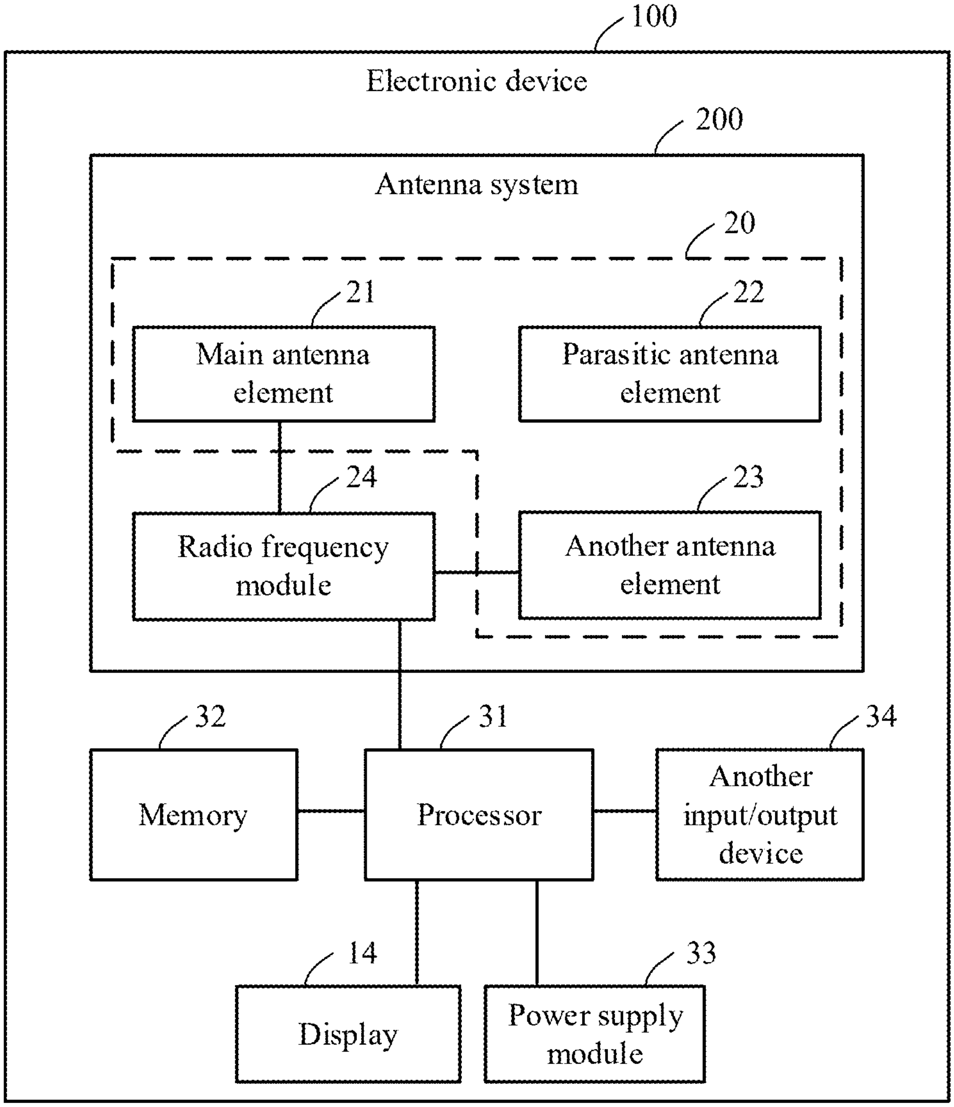
FIG. 12 is a schematic diagram of functional modules of the antenna system shown in FIG. 3, where the antenna system includes a main antenna element and a parasitic antenna element.
Figure 13:
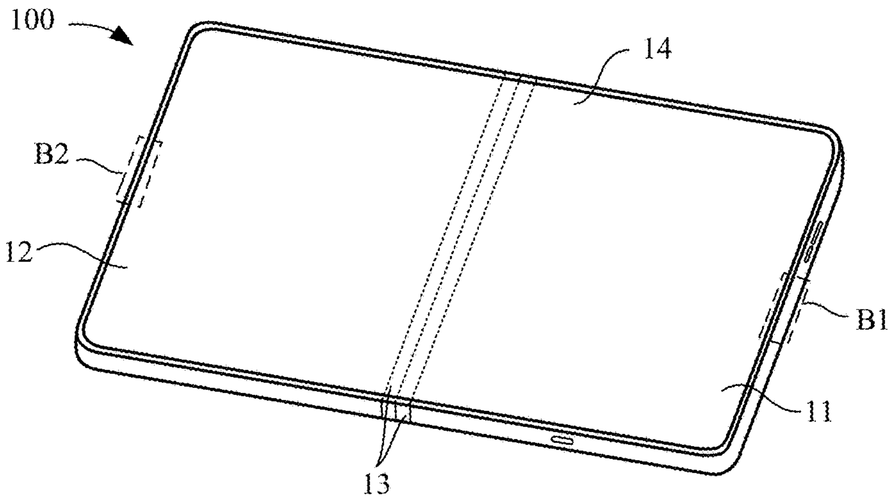
FIG. 13 is a schematic diagram of positions at which the main antenna element and the parasitic antenna element shown in FIG. 12 are respectively disposed in the electronic device.

Specifically, in this implementation, as shown in FIG. 12, an antenna 20 of the antenna system 200 includes a main antenna element 21, a parasitic antenna element 22, and another antenna element 23. As shown in FIG. 13, the main antenna element 21 is disposed on a first edge region B1 of the first body 11, and the parasitic antenna element 22 is disposed on a second edge region B2 of the second body 12. The first edge region B1 includes a part on the first middle frame 411 or a part, close to the first middle frame 411, of the first rear cover 421. The second edge region B2 includes a part on the second middle frame 412 or a part, close to the second middle frame 412, of the second rear cover 422.

Figure 14:
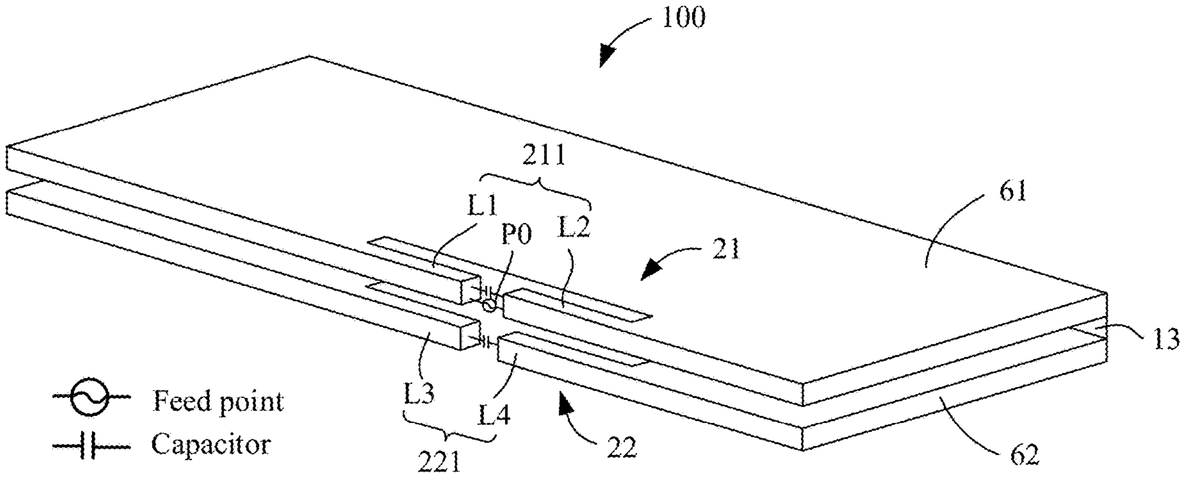
FIG. 14 is a schematic diagram of an equivalent structure of an antenna solution provided in an implementation of this application.

FIG. 14 shows an example of a schematic diagram of an equivalent structure of the main antenna element 21, the parasitic antenna element 22, a first reference ground 61 of the first body 11, and a second reference ground 62 of the second body 12. Refer to FIG. 13 and FIG. 14. The main antenna element 21 includes a first radiating branch 211 disposed on the first edge region B1, and the parasitic antenna element 22 includes a second radiating branch 221 disposed on the second edge region B2. When the electronic device 100 is in an entirely folded state, the first radiating branch 211 and the second radiating branch 221 are at least partially overlapped.

In this implementation, the first edge region B1 is disposed at an edge, opposite to the connecting part 13, of the first body 11, and the second edge region B2 is dispose at an edge, opposite to the connecting part 13, of the second body 12. The another antenna element 23 may be disposed on the middle frame 41 and/or the rear cover, and a form, quantity, position, and the like of the another antenna element 23 are not limited in this application.

In this implementation, both the main antenna element 21 and the parasitic antenna element 22 are antenna structures having a radiation characteristic of a current loop antenna, and the first radiating branch 211 and the second radiating branch 221 are radiators that can perform current loop radiation. The first radiating branch 211 may include one or more radiators. For example, as shown in FIG. 14, the first radiating branch 211 includes two radiators L1 and L2. Similarly, the second radiating branch 221 may also include one or more radiators. For example, as shown in FIG. 14, the second radiating branch 221 includes two radiators L3 and L4. A quantity of radiators of the first radiating branch 211 is determined by an antenna form of the main antenna element 21. Similarly, a quantity of radiators of the second radiating branch 221 is determined by an antenna form of the parasitic antenna element 22. Quantities of radiators of the two radiating branches are not limited in this implementation of this application.

Figures 15, 16A:
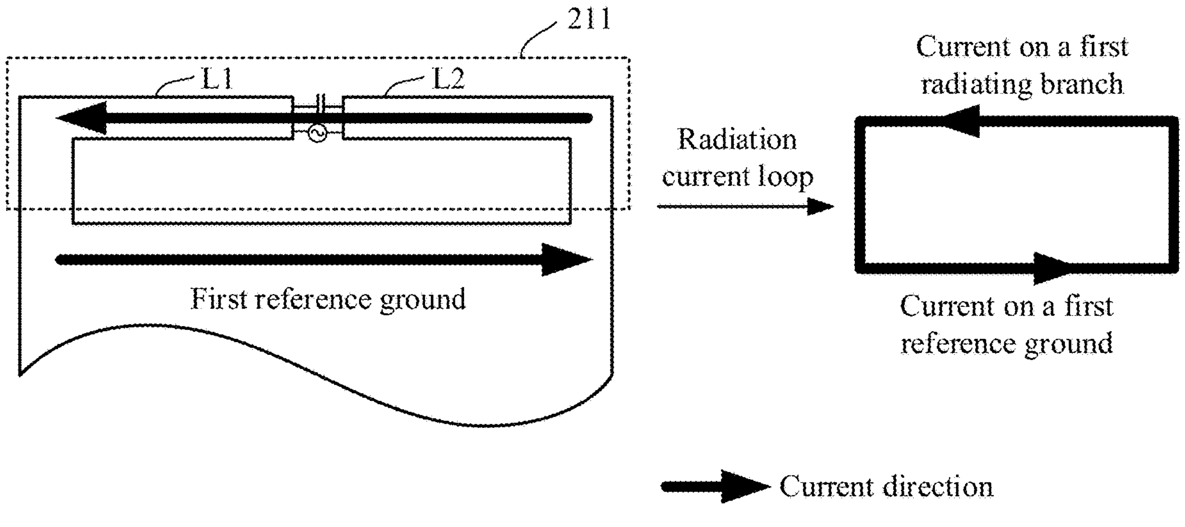
FIG. 15 is a schematic diagram of types of the main antenna element and the parasitic antenna element shown in FIG. 14.
FIG. 16A is a schematic diagram of a current loop formed on the main antenna element shown in FIG. 14.

In this implementation, the main antenna element 21 and the parasitic antenna element 22 may include a plurality of different implementations. For example, as shown in FIG. 15, the main antenna element 21 and the parasitic antenna element 22 may be separately any one of a current loop slot (Slot) antenna, a current loop left-handed antenna, a current loop monopole (Monopole) antenna (such as a current loop ILA antenna), a current loop dipole antenna, and a left-handed antenna. For a structure of the left-handed antenna, refer to descriptions of CN201380008276.8 and CN201410109571.9. Details are not described herein. The current loop slot antenna is an antenna structure based on a slot antenna. The current loop left-handed antenna is an antenna structure based on a left-handed antenna. The current loop monopole antenna is an antenna structure based on a monopole antenna. The current loop dipole antenna is an antenna structure based on a dipole antenna. In this implementation of this application, the current loop monopole antenna, the current loop dipole antenna, the current loop slot antenna, and the current loop left-handed antenna are collectively referred to as current loop antennas. A structure similar to a structure of a typical antenna is used for the current loop antenna as a new antenna form. The current loop antenna can generate an evenly distributed magnetic field through excitation around radiating branches of the current loop antenna, generating resonance to cover an operating band. For various structures and an operation principle of the current loop antenna, refer to description of CN202110961752.4. Details are not described herein.

In this implementation, the first radiating branch 211 is configured to perform magnetic field coupling with the second radiating branch 221, to form current loop radiation on both the first radiating branch 211 and the second radiating branch 221, and a current direction in a current loop formed on the first radiating branch 211 is the same as a current direction in a current loop formed on the second radiating branch 221.

Specifically, in this implementation, the main antenna element 21 further includes a feed point P0. The feed point P0 is used to feed the first radiating branch 211, to generate currents on the two radiators L1 and L2 of the first radiating branch 211, forming radiation having a radiation characteristic of a current loop antenna.

The parasitic antenna element 22 is a passive antenna structure including a resonant structure, and the first radiating branch 211 is further configured to perform magnetic field coupling with the second radiating branch 221, to implement excitation of a current on the second radiating branch 221 through magnetic field coupling. This enables the second radiating branch 221 to perform radiation having the radiation characteristic of a current loop antenna. Specifically, the second radiating branch 221 obtains magnetic excitation from the two radiators L11 and L12 through magnetic field coupled feeding with the first radiating branch 211, to generate currents on the two radiators L3 and L4, forming radiation having the radiation characteristic of a current loop antenna.

When the electronic device 100 is in a folded state and the main antenna element 21 is operating, a current is generated on the first radiating branch 211, to perform current loop radiation. FIG. 16A shows a schematic diagram of a current loop formed on the main antenna element 21. As shown in FIG. 16A, a direction of a current generated through excitation on the first radiating branch 211 is opposite to a direction of a current generated through excitation on a part, close to the first radiating branch 211, of the first reference ground 61. Therefore, the current on the first radiating branch 211 and the current generated on the part, close to the first radiating branch 211, of the first reference ground 61 form a closed first radiation current loop, forming the "current loop".

Figure 16B:
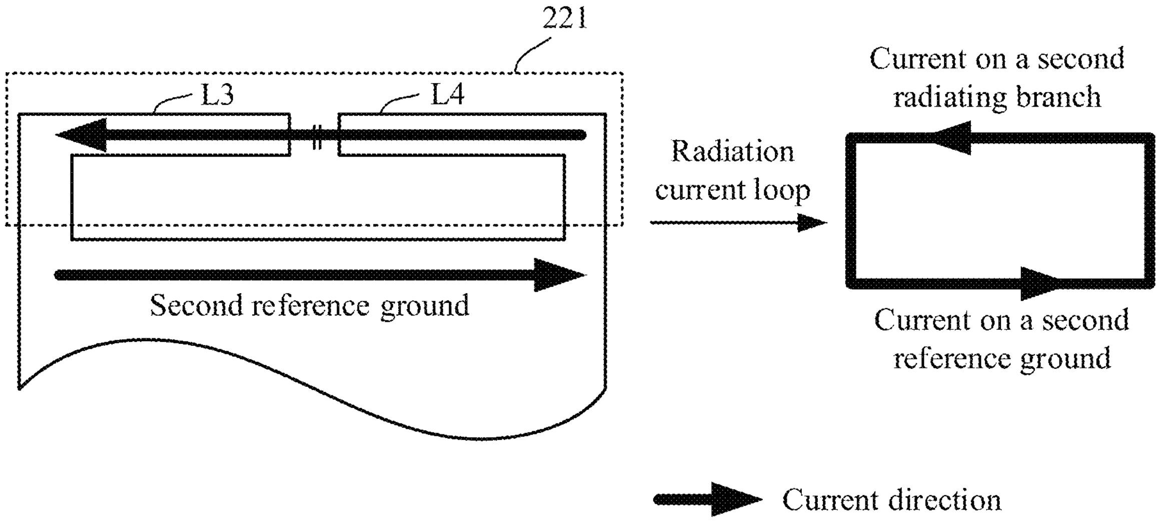
FIG. 16B is a schematic diagram of a current loop formed on the parasitic antenna element shown in FIG. 14.

In addition, the main antenna element 21 further excites radiation of the parasitic antenna element 22. Specifically, under excitation of the current on the first radiating branch 211, the first radiating branch 211 couples energy to the second radiating branch 221 through magnetic field coupling, to implement coupled feeding on the second radiating branch 221, exciting the second radiating branch 221 to perform radiation having the radiation characteristic of a current loop antenna. For example, the second radiating branch 221 is excited to generate an even magnetic field for radiation. FIG. 16B shows a schematic diagram of a current loop formed on the parasitic antenna element 22. As shown in FIG. 16B, a direction of a current generated through excitation on the second radiating branch 221 of the parasitic antenna element 22 is opposite to a direction of a current generated through excitation on a part, close to the second radiating branch 221, of the second reference ground 62. Therefore, the current on the second radiating branch 221 and the current on the part, close to the second radiating branch 221, of the second reference ground 62 form a closed second radiation current loop, forming a "current loop".

Figure 17:
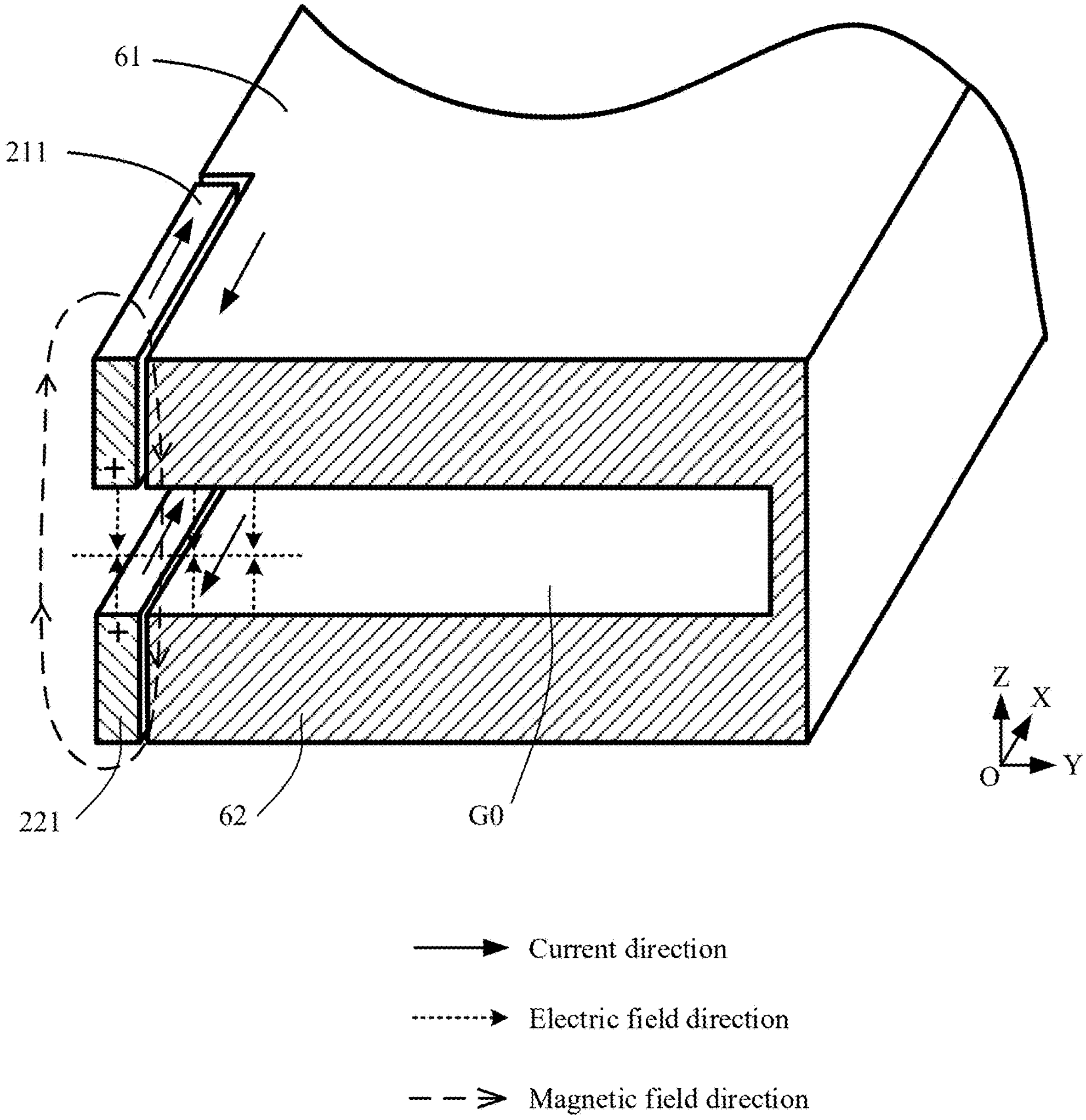
FIG. 17 is a schematic diagram of a principle of current distribution generated by exciting an eigenmode of the foldable grounding plate shown in FIG. 5 by using the antenna solution shown in FIG. 14.

A principle of an electric field and a current generated by exciting the eigenmode of the foldable grounding plate 60 in the antenna solution provided in this implementation of this application are analyzed below with reference to a schematic diagram shown in FIG. 17. As shown in FIG. 17, when the electronic device 100 is in the folded state and the main antenna element 21 is operating, a longitudinal current is excited on the first radiating branch 211, and a magnetic field induced around the first radiating branch 211 surrounds the first radiating branch 211 and the second radiating branch 221 simultaneously. Because the first radiating branch 211 and the second radiating branch 221 share a same magnetic field, according to the Lenz's law, a longitudinal current in a same direction may also be induced on the second radiating branch 221. To be specific, the first radiating branch 211 and the second radiating branch 221 are coupled through a magnetic field, and the first radiating branch 211 can couple a current in the same direction on the second radiating branch 221. In other words, the current direction on the first radiating branch 211 is the same as the current direction on the second radiating branch 221.

The main antenna element 21 and the parasitic antenna element 22 are both antenna structures having the radiation characteristic of a current loop antenna. In addition, as described above, the direction of the current generated through excitation on the first radiating branch 211 is opposite to a direction of a current generated through excitation on a part, close to the first radiating branch 211, of the first reference ground 61, and the direction of the current generated through excitation on the second radiating branch 221 of the parasitic antenna element 22 is opposite to a direction of a current generated through excitation on a part, close to the second radiating branch 221, of the second reference ground 62. Therefore, a longitudinal current direction on the first reference ground 61 is the same as a longitudinal current direction on the second reference ground 62, to achieve a purpose of enhancing excitation of the longitudinal mode.

In addition, because currents in the same direction are generated on the first radiating branch 211 and the second radiating branch 221, currents in a same direction are also induced on the first reference ground 61 near the first radiating branch 211 and on the second reference ground 62 near the second radiating branch 221. Both the upper grounding plate and the lower grounding plate are positively charged. In this manner, in the gap G0, an electric field generated by inducing the first radiating branch 211 and an electric field generated by inducing the second radiating branch 221 offset each other. This enables no electric field to be generated in the gap G0, or an electric field generated in the gap G0 by the main antenna element 21 is weakened.

It may be understood that when the main antenna element 21 and the parasitic antenna element 22 are disposed to be overlapped, and resonance structures of the main antenna element 21 and the parasitic antenna element 22 are similar and resonance points of the main antenna element 21 and the parasitic antenna element 22 are close to each other, the electric field in the gap G0 can achieve an effect of completely being offset. When the electric field in the gap G0 is entirely offset or weakened, no transverse current is generated on inner surfaces of the upper grounding plate and the lower grounding plate, or a transverse current is weakened. In this manner, distribution of the transverse current in the gap mode is damaged, achieving a purpose of suppressing excitation of the gap mode of the foldable grounding plate 60.

Figure 18A:
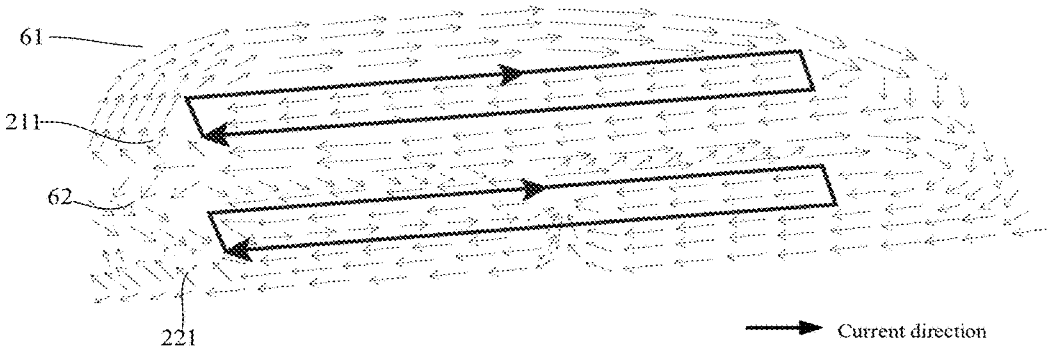
FIG. 18A is a schematic diagram of simulation of current distribution generated when the main antenna element and the parasitic antenna element shown in FIG. 14 resonate.

FIG. 18A shows a schematic diagram of simulation of current distribution generated when the main antenna element 21 and the parasitic antenna element 22 resonate. As shown in FIG. 18A, in a case that an antenna structure through which current loop radiation can be performed is used for both the main antenna element 21 and the parasitic antenna element 22, when the electronic device 100 is in the folded state and the main antenna element 21 is operating, by using the main antenna element 21, a closed clockwise current loop is excited on the first radiating branch 211 and the first reference ground 61, and a closed clockwise current loop is also excited on the second radiating branch 221 and the second reference ground 62. A current direction on the first radiating branch 211 is the same as a current direction on the second radiating branch 221, and the current direction on the first radiating branch 211 is opposite to a current direction on the first reference ground 61. A current direction on the second radiating branch 221 is opposite to a current direction on the second reference ground 62, and the current direction on the first reference ground 61 is the same as a current direction on the second reference ground 62.

Figure 18B:
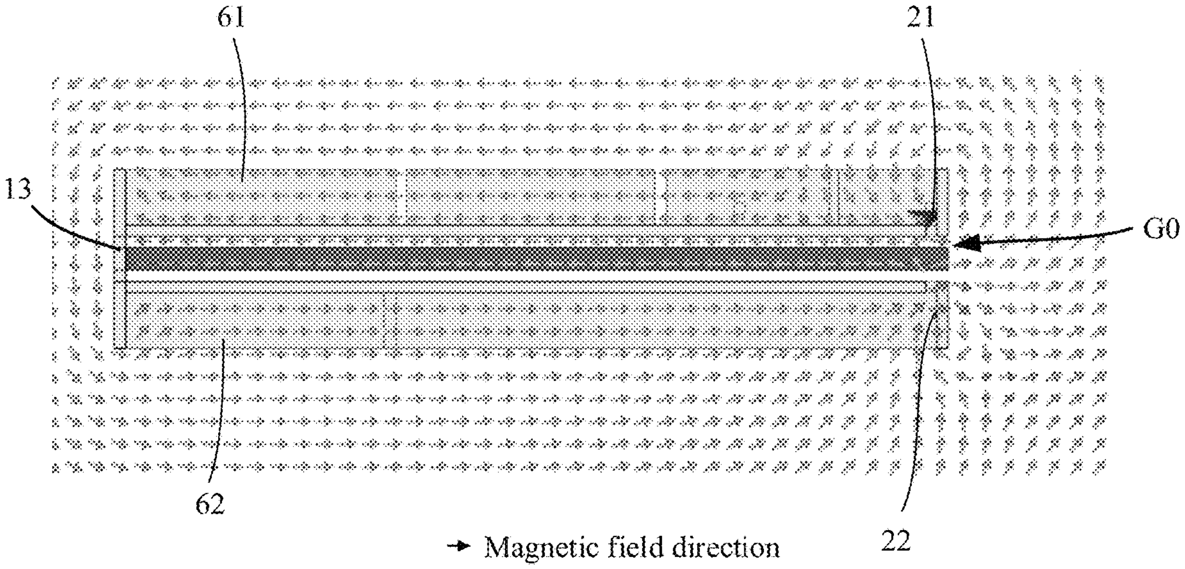
FIG. 18B is a schematic diagram of simulation of magnetic field distribution generated when the main antenna element and the parasitic antenna element shown in FIG. 14 resonate.

FIG. 18B shows a schematic diagram of simulation of magnetic field distribution generated when the main antenna element 21 and the parasitic antenna element 22 resonate. As shown in FIG. 18B, when an antenna structure through which current loop radiation can be performed is used for both the main antenna element 21 and the parasitic antenna element 22, a magnetic field in the gap G0 is basically distributed in a transverse direction of the foldable grounding plate 60. This indicates a longitudinal direction of a current in the gap G0 along the foldable grounding plate 60. In this manner, transverse current distribution in the gap mode is basically damaged. In other words, the gap mode of the foldable grounding plate 60 is suppressed. Therefore, the gap mode is hardly excited.

Figure 18C:
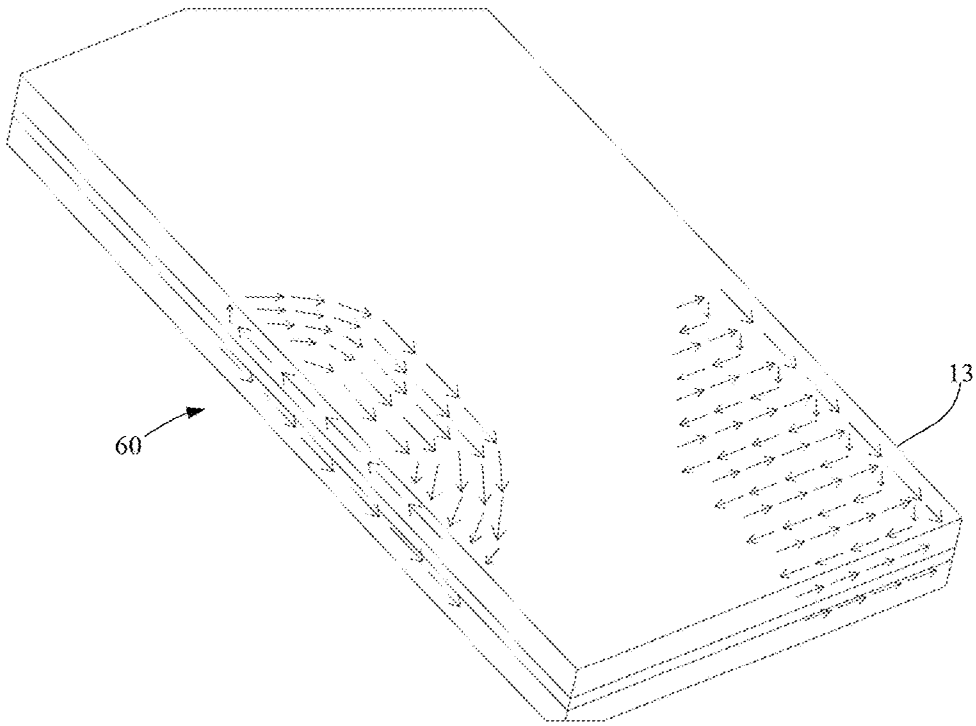
FIG. 18C is a schematic diagram of simulation of current distribution corresponding to an eigenmode that is of a foldable grounding plate of the electronic device and that is obtained by exciting the main antenna element and the parasitic antenna element shown in FIG. 14.

Based on the current distribution shown in FIG. 18A and the magnetic field distribution shown in FIG. 18B, FIG. 18C shows a schematic diagram of simulation of current distribution corresponding to the eigenmode that is of the foldable grounding plate 60 and that is obtained by exciting the main antenna element 21 and the parasitic antenna element 22. When an antenna structure through which current loop radiation can be performed is used for both the main antenna element 21 and the parasitic antenna element 22, because longitudinal currents in a same direction are excited on the upper reference ground and the lower reference ground, namely, the first reference ground 61 and the second reference ground 62, of the foldable grounding plate 60, no vertical outward magnetic field is basically generated in the gap G0. Therefore, excitation of a transverse current is reduced. As shown in FIG. 18C, the longitudinal mode of the foldable grounding plate 60 is enhanced, while the gap mode is significantly weakened. In this manner, when the gap mode is weakened and the transverse current is significantly reduced, energy absorbed or consumed by a high-loss material in the gap G0 is reduced. Therefore, antenna efficiency of the electronic device 100 in the folded state can be increased, enhancing a radiation capability.

Compared with FIG. 11A and FIG. 18C, it may be learned that, the parasitic antenna element is added in the antenna structure provided in this implementation, and the antenna structure through which current loop radiation can be performed is used for both the main antenna element and the parasitic antenna element, so that excitation effect of the longitudinal mode of the foldable grounding plate 60 is far greater than effect of excitation on the longitudinal mode of the foldable grounding plate 60 by an ordinary IFA.

In addition, it may be learned from FIG. 18C that there are still a few transverse currents at a corner of the connecting part 13 because a position at which a radiating branch of the main antenna element 21 is disposed and a position at which a radiating branch of the parasitic antenna element 22 is disposed respectively deviate from a middle of an edge of a body at which the radiating branch of the main antenna element 21 is located and a middle of an edge of a body at which the radiating branch of the parasitic antenna element 22 is located. After simulation, it is found that, when the first radiating branch 211 is disposed in a middle of an edge, opposite to the connecting part 13, of the first body 11, the second radiating branch 221 is disposed in a middle of an edge, opposite to the connecting part 13, of the second body 12. In other words, when the first edge region B1 is located in a middle of an edge, opposite to the connecting part 13, of the first body 11, and the second edge region B2 is located in a middle of an edge, opposite to the connecting part 13, of the second body 12, the transverse currents at the corner of the connecting part 13 basically disappear. In this manner, the antenna efficiency in the folded state may be further increased, to enable the electronic device to obtain better antenna performance in the folded state.

Based on various implementations of the main antenna element 21 and the parasitic antenna element 22 listed in FIG. 15, it may be learned that there are at least 25 combination forms of the main antenna element 21 and the parasitic antenna element 22. In this manner, in specific application, based on an actual antenna design requirement for the foldable electronic device, various antenna combination forms may be flexibly used to increase the antenna efficiency of the electronic device in the folded state, to enable the electronic device to obtain good antenna performance in the folded state.

Structures of the main antenna element 21 and the parasitic antenna element 22 are described below with reference to several combination forms of the antenna structure, to more clearly describe a magnetic field coupling antenna solution provided in an implementation of this application.

Figure 19:
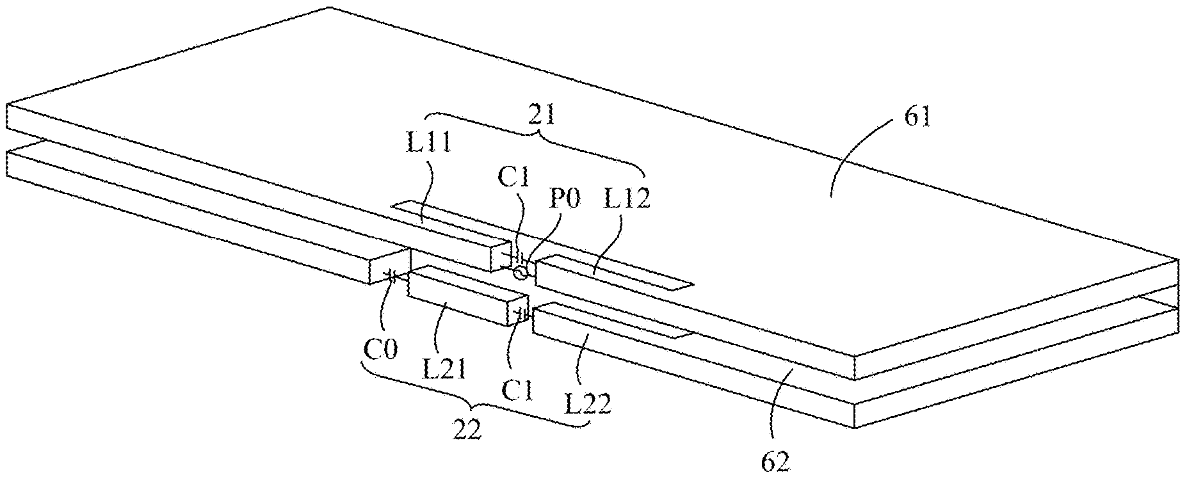
FIG. 19 is a schematic diagram of an equivalent structure of a combination form of an antenna solution according to an implementation of this application, where a main antenna element is a current loop slot antenna, and a parasitic antenna element is a current loop left-handed antenna.

In an implementation, as shown in FIG. 19, the main antenna element 21 is a current loop slot antenna, and the parasitic antenna element 22 is a current loop left-handed antenna.

Figure 20A:
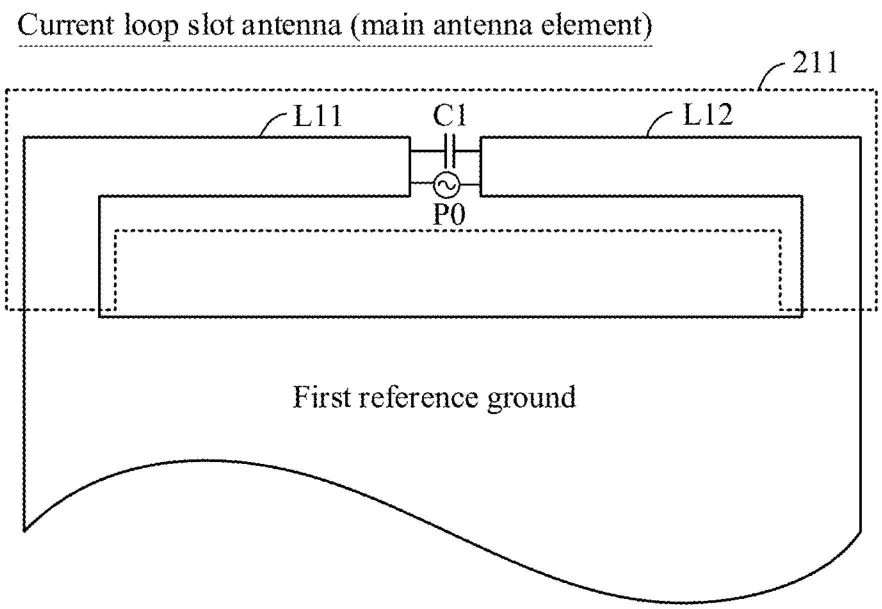
FIG. 20A is a schematic diagram of a planar structure of the current loop slot antenna shown in FIG. 19.

Refer to FIG. 19 and FIG. 20A. The radiating branch 211 of the current loop slot antenna 21 includes two radiators L11 and L12 with opposite ends. The two radiators L11 and L12 are spaced apart by a gap, and a gap is formed between the two radiators L11 and L12 and the first reference ground 61. The opposite ends of the two radiators L11 and L12 are coupled through a first capacitor C1, and the other ends of the two radiators L11 and L12 are directly coupled to the first reference ground 61 respectively.

In a different implementation, a capacitance value of the first capacitor C1 may be determined based on an operating band of the current loop slot antenna 21. It may be understood that, due to disposing of the first capacitor C1 and based on an electric energy storage characteristic of the capacitor, a difference in current distribution on the radiator L11 and the radiator L12 at different positions at a same time point is not extremely large. In other words, an even current is generated on the radiator L11 and radiator L12. Based on the even current on the radiator L11 and radiator L12, an even current may also be generated on the first reference ground 61, and a current direction on the first reference ground 61 is opposite to a current direction on the radiator L11 and radiator L12, to form a closed even current loop between the radiator L11 and the radiator L12, and the first reference ground 61 near the radiator L11 and radiator L12. In this manner, an evenly distributed magnetic field may be obtained in space near the radiator L11 and radiator L12, achieving effect of current loop radiation.

In the implementation shown in FIG. 19, the current loop slot antenna 21 is used as a main antenna element, and the current loop slot antenna 21 also includes a feed point P0. The feed point P0 is used to feed the radiating branch of the current loop slot antenna 21.

In an implementation, a feeding form of the radiating branch of the current loop slot antenna 21 is a direct feeding form. To be specific, the radiating branch of the current loop slot antenna 21 is coupled to the feed point P0, and is used to generate a current by exciting the feed point P0, to perform radiation having a radiation characteristic of a current loop antenna. Specifically, as shown in FIG. 19 and FIG. 20A, the opposite ends of the two radiators L11 and L12 of the radiating branch 211 of the current loop slot antenna 21 are respectively coupled to the feed point P0.

Figure 20B:
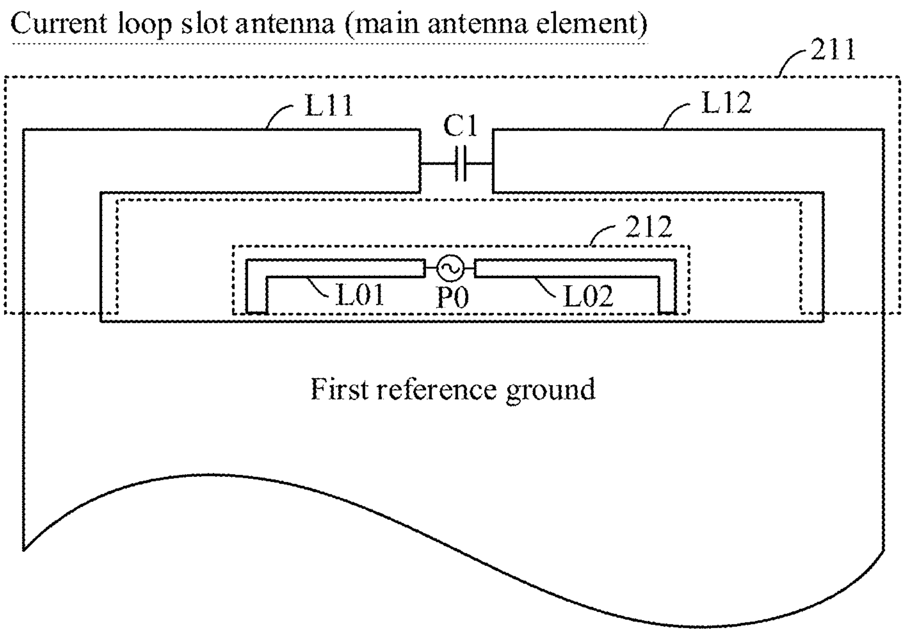
FIG. 20B is a schematic diagram of another planar structure of the current loop slot antenna shown in FIG. 19.

In another implementation, a feeding form of the radiating branch 211 of the current loop slot antenna 21 is a coupled feeding form. Specifically, as shown in FIG. 20B, the current loop slot antenna 21 further includes a feed branch 212. The feed branch 212 and the radiating branch 211 are spaced apart, and the feed branch 212 is disposed between the radiating branch 211 and the first reference ground 61. The feed point P0 is disposed on the feed branch 212, and the feed branch 212 is used to perform coupled feeding on the radiating branch 211. To be specific, the feed branch 212 couples energy to the radiating branch 211 through electric field coupling/magnetic field coupling, to excite the radiating branch 211 to perform current loop radiation. More specifically, the feed branch 212 includes a first feed part L01 and a second feed part L02 with opposite ends. One end of the first feed part L01 is coupled to one end of the feed point P0, one end of the second feed part L02 is coupled to the other end of the feed point P0, and the other end of first feed part L01 and the other end of the second feed part L02 are respectively coupled to the first reference ground 61.

Figure 20C:
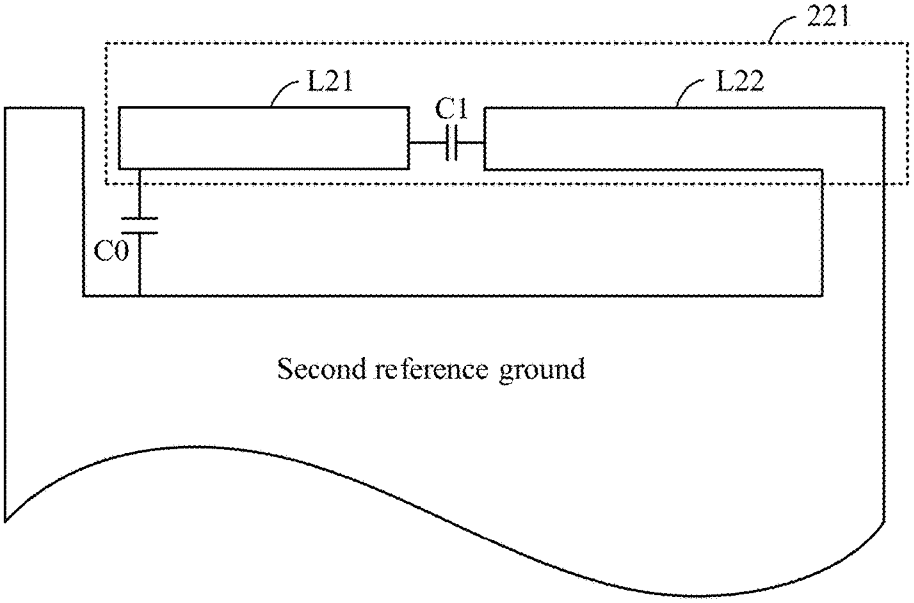
FIG. 20C is a schematic diagram of a planar structure of the current loop left-handed antenna shown in FIG. 19.

Refer to FIG. 19 and FIG. 20C. A radiating branch 221 of the current loop left-handed antenna 22 includes two radiators L21 and L22 with opposite ends. The two radiators L21 and L22 are spaced apart by a gap, and a gap is formed between the two radiators L21 and L22 and the second reference ground 62. The opposite ends of the two radiators L21 and L22 are coupled through a first capacitor C1. One end, away from the radiator L22, of the radiator L21 is coupled to the second reference ground 62 through a fourth capacitor C0 (for example, a left-handed capacitor). One end, away from the radiator L21, of the radiator L22 is directly connected to the second reference ground 62.

In a different implementation, capacitance values of the fourth capacitor C0 and the first capacitor C1 may be determined based on an operating band of the current loop left-handed antenna 22. Disposing of the fourth capacitor C0 may be used to excite the two radiators L21 and L22 to generate corresponding left-handed mode resonance for radiation.

For principles of magnetic field coupling performed between the current loop slot antenna 21 and the current loop left-handed antenna 22 and radiation having a radiation characteristic of a current loop antenna, refer to detailed description of the main antenna element 21 and the parasitic antenna element 22 shown in FIG. 14. The details are not described herein again.

Figure 21:
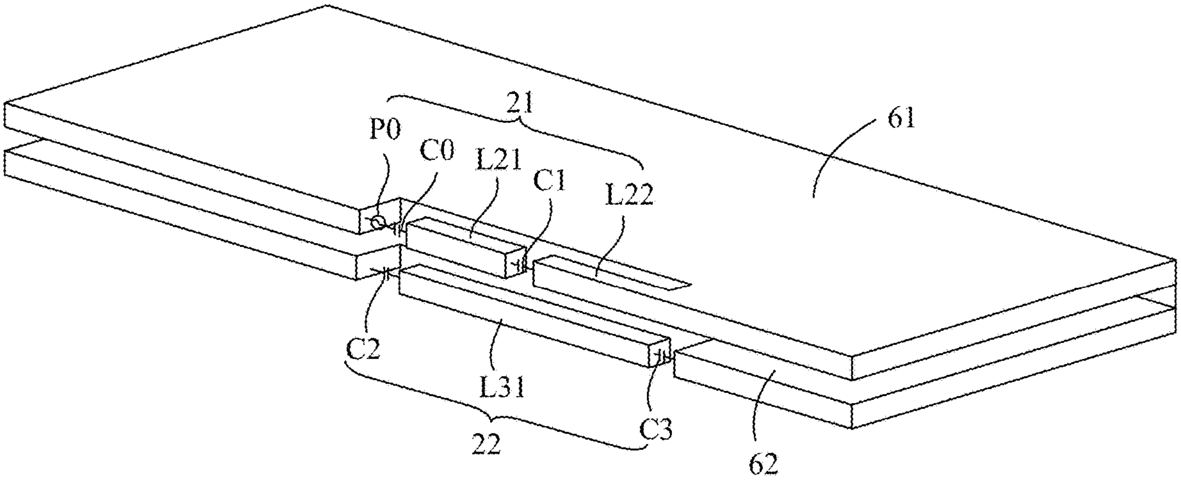
FIG. 21 is a schematic diagram of an equivalent structure of another combination form of an antenna structure according to an implementation of this application, where a main antenna element is a current loop left-handed antenna, and a parasitic antenna element is a current loop monopole antenna.

In another implementation, as shown in FIG. 21, the main antenna element 21 is a current loop left-handed antenna, and the parasitic antenna element 22 is a current loop monopole antenna.

A structure of the current loop left-handed antenna 21 shown in FIG. 21 is similar to the structure of the current loop left-handed antenna 22 shown in FIG. 19. A difference is that the current loop left-handed antenna 21 shown in FIG. 21 is used as the main antenna element, and the current loop left-handed antenna 21 further includes a feed point P0. The feed point P0 is used to feed a radiating branch of the current loop left-handed antenna 21.

Figure 22A:
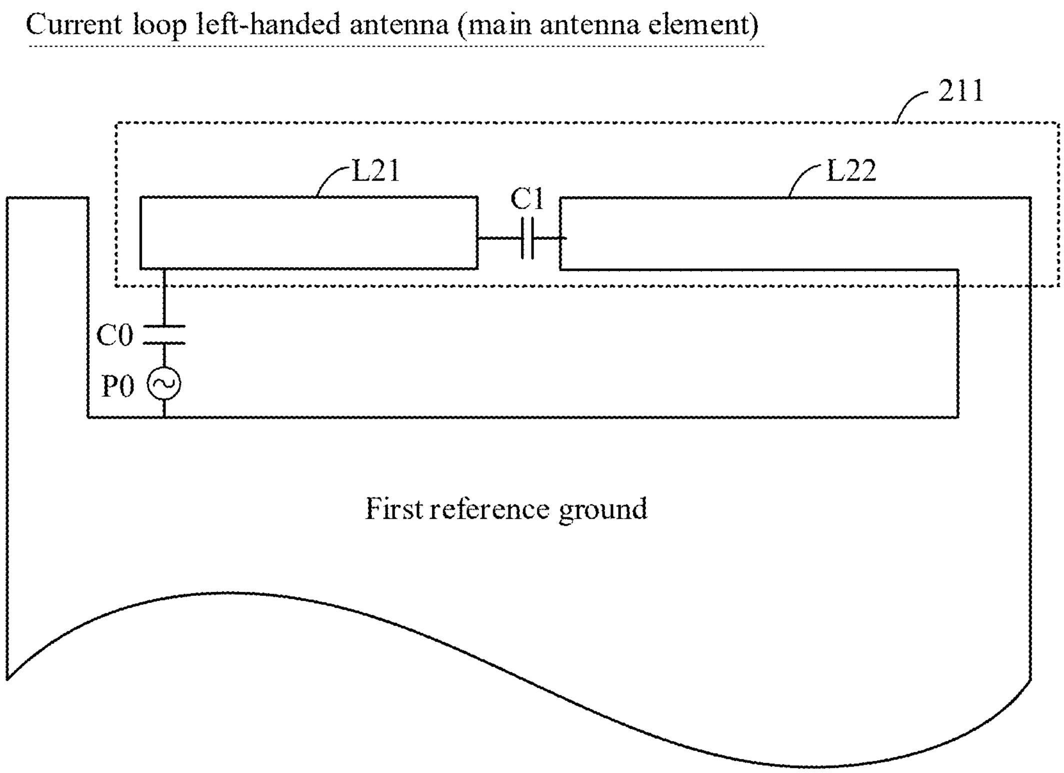
FIG. 22A is a schematic diagram of a planar structure of the current loop left-handed antenna shown in FIG. 21.

In an implementation, a feeding form of the radiating branch of the current loop left-handed antenna 21 is a direct feeding form. To be specific, the radiating branch of the current loop left-handed antenna 21 is coupled to the feed point P0, and is used to generate a current by exciting the feed point P0, to perform radiation having a radiation characteristic of a current loop antenna. Specifically, as shown in FIG. 21 and FIG. 22A, one end, away from the radiator L22, of the radiator L21 of the radiating branch 211 of the current loop left-handed antenna 21 is coupled to the feed point P0 through the fourth capacitor C0.

Figure 22B:
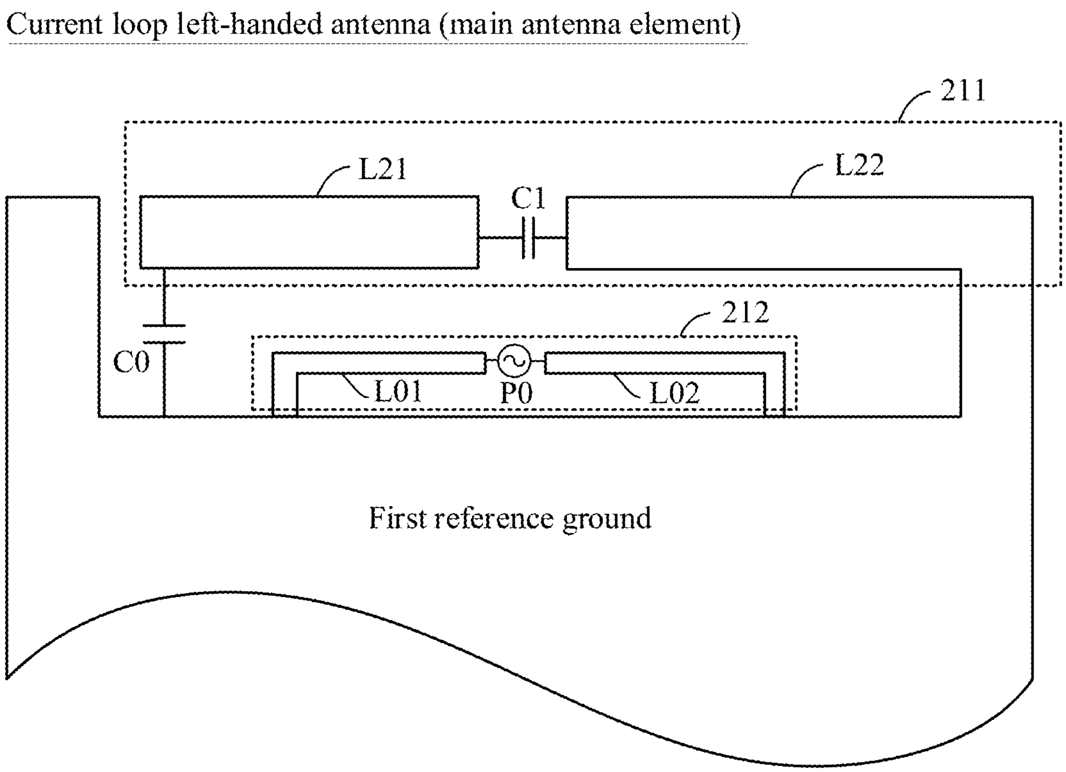
FIG. 22B is a schematic diagram of another planar structure of the current loop left-handed antenna shown in FIG. 21.

In another implementation, a feeding form of the radiating branch of the current loop left-handed antenna 21 is a coupled feeding form. Specifically, as shown in FIG. 22B, the current loop left-handed antenna 21 further includes a feed branch 212. The feed branch 212 and the radiating branch 211 are spaced apart. The feed branch 212 is disposed between the radiating branch 211 and the first reference ground 61. The feed point P0 is disposed on the feed branch 212. A structure and coupled feeding principle of the feed branch 212 shown in FIG. 22B are the same as a structure and coupled feeding principle of the feed branch 212 shown in FIG. 20B. For specific technical details, refer to detailed description of the feed branch 212 shown in FIG. 20B. The details are not described herein again.

Figure 22C:
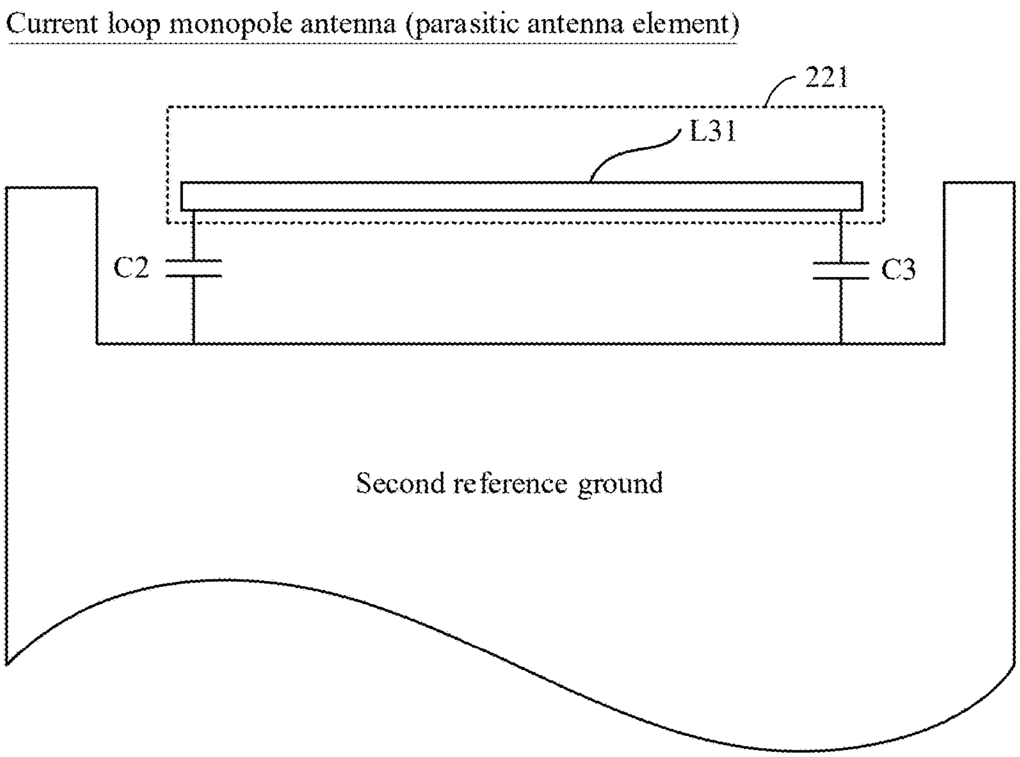
FIG. 22C is a schematic diagram of a planar structure of the current loop monopole antenna shown in FIG. 21.

Refer to FIG. 21 and FIG. 22C. A radiating branch 221 of the current loop monopole antenna 22 includes at least one radiator L31. The radiator L31 and the second reference ground 62 are spaced apart by a gap. In this implementation, to obtain an even magnetic field through excitation, one end of the radiator L31 is coupled to the second reference ground 62 through a second capacitor C2, and the other end of the radiator L31 is coupled to the second reference ground 62 through a third capacitor C3. Capacitance values of the second capacitor C2 and the third capacitor C3 may be the same or different. A length of the radiating branch 221 of the current loop monopole antenna 22, namely, a length of the radiator L31, may be related to an operating band of the current loop monopole antenna 22. For example, the length of the radiator L31 may be less than or equal to ¼ of an operating wavelength corresponding to the operating band of the current loop monopole antenna 22. The operating wavelength corresponding to the operating band may be a wavelength corresponding to a central frequency of the operating band.

For principles of magnetic field coupling performed between the current loop left-handed antenna 21 and the current loop monopole antenna 22 and radiation having a radiation characteristic of a current loop antenna, refer to detailed description of the main antenna element 21 and the parasitic antenna element 22 shown in FIG. 14. The details are not described herein again.

Figure 23:
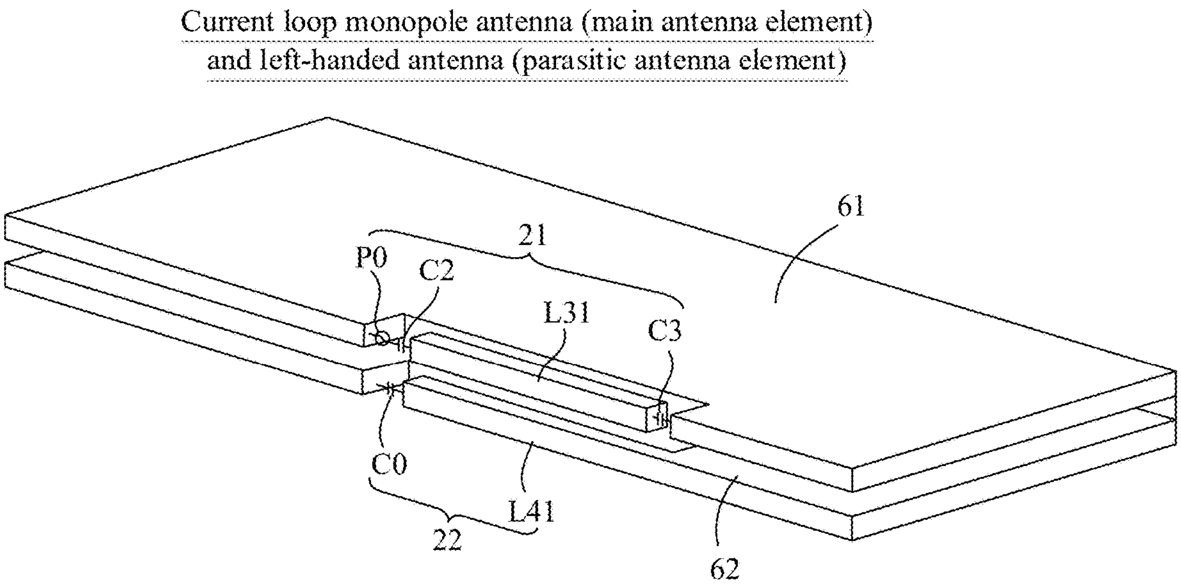
FIG. 23 is a schematic diagram of an equivalent structure of another combination form of an antenna structure according to an implementation of this application, where a main antenna element is a current loop monopole antenna, and a parasitic antenna element is a left-handed antenna.

In another implementation, as shown in FIG. 23, the main antenna element 21 is a current loop monopole antenna, and the parasitic antenna element 22 is a left-handed antenna.

A structure of the current loop monopole antenna 21 shown in FIG. 23 is similar to the structure of the current loop monopole antenna 22 shown in FIG. 21. A difference is that the current loop monopole antenna 21 shown in FIG. 23 is used as the main antenna element, and the current loop monopole antenna 21 further includes a feed point P0. The feed point P0 is used to feed a radiating branch of the current loop monopole antenna 21.

Figure 24A:
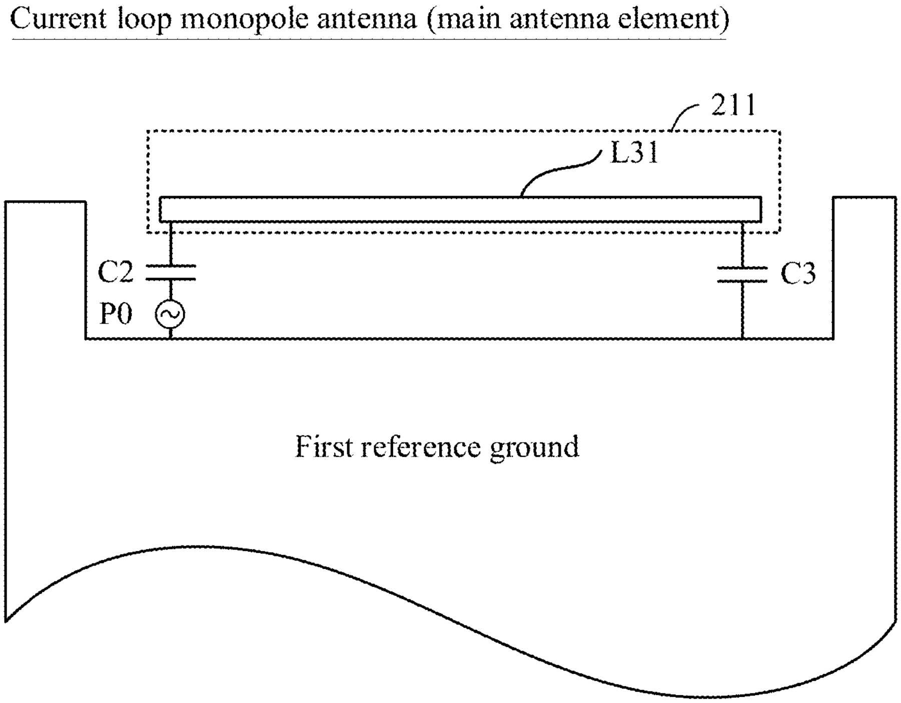
FIG. 24A is a schematic diagram of a planar structure of the current loop monopole antenna shown in FIG. 23.

In an implementation, a feeding form of the radiating branch of the current loop monopole antenna 21 is a direct feeding form. To be specific, the radiating branch of the current loop monopole antenna 21 is coupled to the feed point P0, and is used to generate a current by exciting the feed point P0, to perform radiation having a radiation characteristic of a current loop antenna. Specifically, as shown in FIG. 23 and FIG. 24A, one end of a radiator L31 of the radiating branch 211 of the current loop monopole antenna 21 is coupled to the feed point P0 through the second capacitor C2.

Figure 24B:
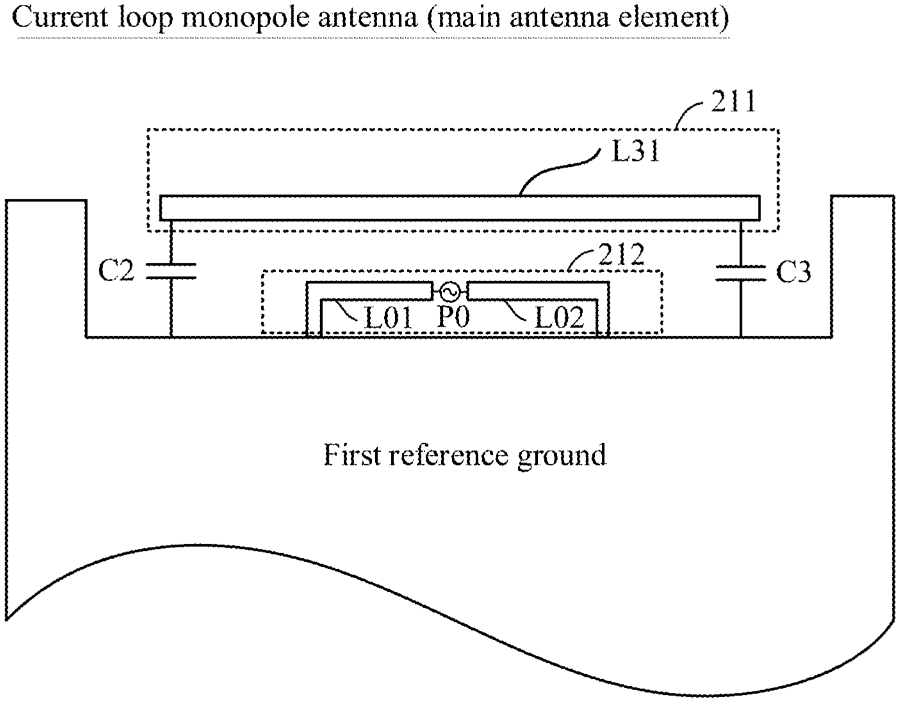
FIG. 24B is a schematic diagram of another planar structure of the current loop monopole antenna shown in FIG. 23.

In another implementation, a feeding form of the radiating branch of the current loop monopole antenna 21 is a coupled feeding form. Specifically, as shown in FIG. 24B, the current loop monopole antenna 21 further includes a feed branch 212. The feed branch 212 and the radiating branch 211 are spaced apart. The feed branch 212 is disposed between the radiating branch 211 and the first reference ground 61. The feed point P0 is disposed on the feed branch 212. A structure and coupled feeding principle of the feed branch 212 shown in FIG. 24B are the same as a structure and coupled feeding principle of the feed branch 212 shown in FIG. 20B. For specific technical details, refer to detailed description of the feed branch 212 shown in FIG. 20B. The details are not described herein again.

Figure 24C:
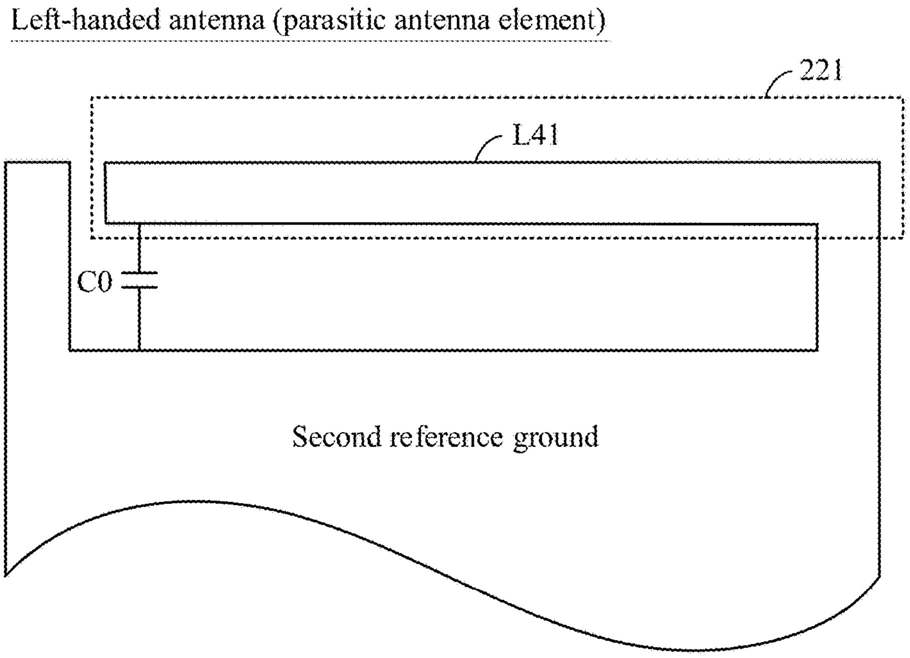
FIG. 24C is a schematic diagram of a planar structure of the left-handed antenna shown in FIG. 23.

Refer to FIG. 23 and FIG. 24C. A radiating branch 221 of the left-handed antenna 22 includes one radiator L41. The radiator L41 and the second reference ground 62 are spaced apart by a gap. One end of the radiator L41 is coupled to the second reference ground 62 through a fourth capacitor C0 (for example, a left-handed capacitor), and the other end of the radiator L41 is directly coupled to the second reference ground 62.

In a different implementation, a capacitance value of the fourth capacitor C0 may be determined based on an operating band of the left-handed antenna 22. Disposing of the fourth capacitor C0 may be used to excite the radiator L41 to generate corresponding left-handed mode resonance for radiation.

For principles of magnetic field coupling performed between the current loop monopole antenna 21 and the left-handed antenna 22 and radiation having a radiation characteristic of a current loop antenna, refer to detailed description of the main antenna element 21 and the parasitic antenna element 22 shown in FIG. 14. The details are not described herein again.

Figure 25:
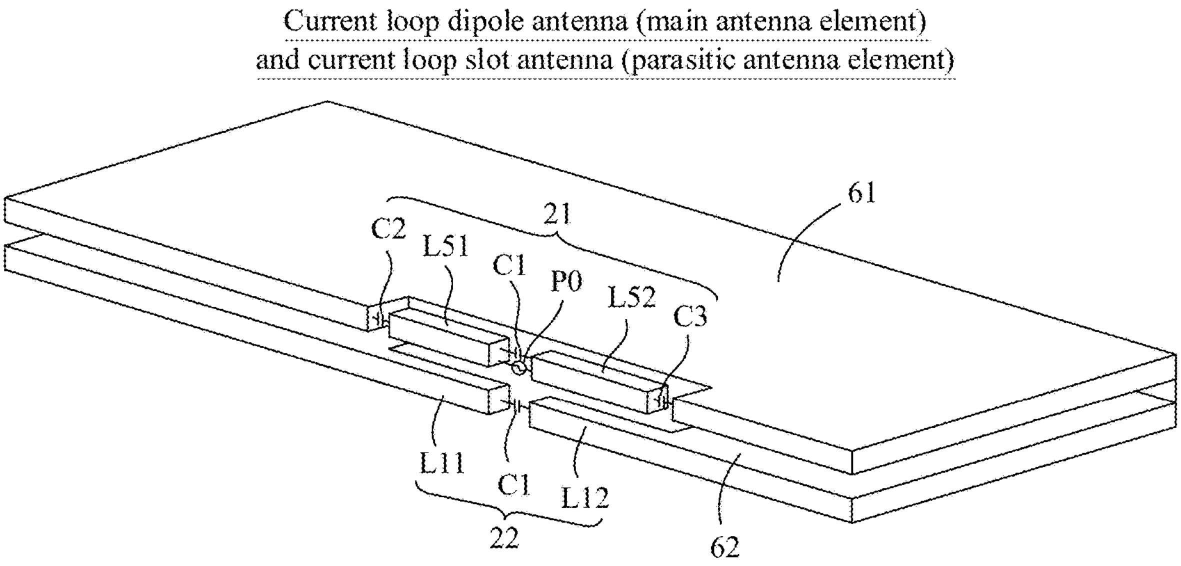
FIG. 25 is a schematic diagram of an equivalent structure of another combination form of an antenna structure according to an implementation of this application, where a main antenna element is a current loop dipole antenna, and a parasitic antenna element is a current loop slot antenna.

In another implementation, as shown in FIG. 25, the main antenna element 21 is a current loop dipole antenna, and the parasitic antenna element 22 is a current loop slot antenna.

Figure 26A:
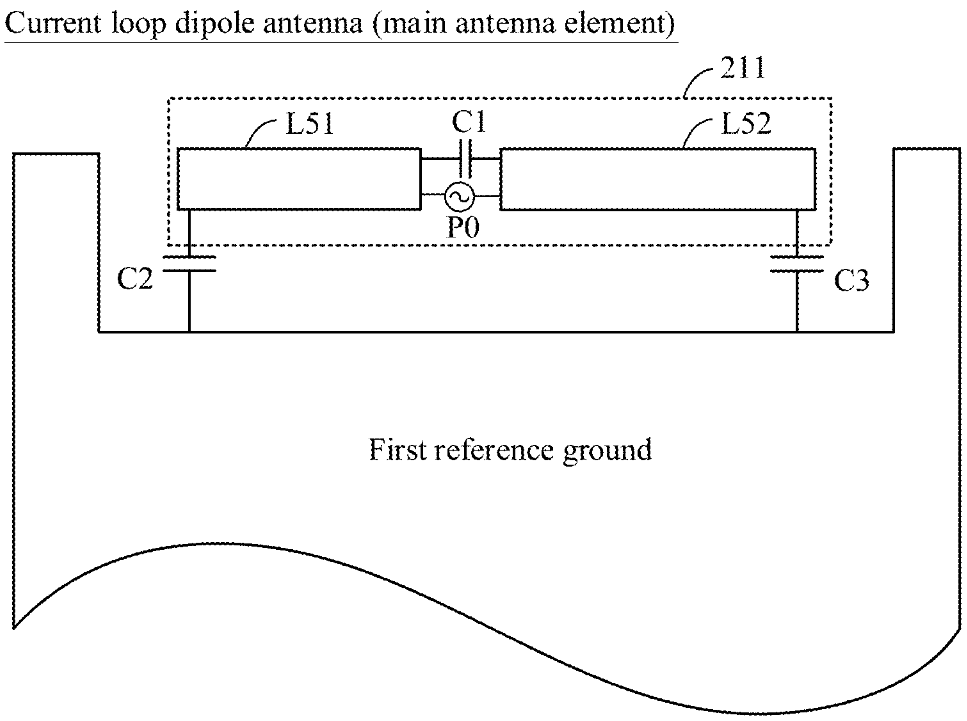
FIG. 26A is a schematic diagram of a planar structure of the current loop dipole antenna shown in FIG. 25.

Refer to FIG. 25 and FIG. 26A. A radiating branch 211 of the current loop dipole antenna 21 includes two radiators L51 and L52 with opposite ends. The two radiators L51 and L52 are spaced apart by a gap, and a gap is formed between the two radiators L51 and L52 and the first reference ground 61. The opposite ends of the two radiators L51 and L52 are coupled through a first capacitor C1. One end, away from the radiator L52, of the radiator L51 is coupled to the first reference ground 61 through a second capacitor C2. One end, away from the radiator L51, of the radiator L52 is coupled to the first reference ground 61 through a third capacitor C3.

In a different implementation, capacitance values of the first capacitor C1, the second capacitor C2, and the third capacitor C3 may be determined based on an operating band of the current loop dipole antenna 21. It may be understood that, due to disposing of the first capacitor C1 and based on an electric energy storage characteristic of the capacitor, a difference in current distribution on the radiator L51 and radiator L52 at different positions at a same time point is not extremely large. In other words, an even current is generated on the radiator L51 and radiator L52. Based on the even current on the radiator L51 and radiator L52, an even current may also be generated on the first reference ground 61, and a current direction on the first reference ground 61 is opposite to a current direction on the radiator L51 and radiator L52, to form a closed even current loop between the radiator L51 and the radiator L52, and the first reference ground 61 near the radiator L51 and radiator L52. In this manner, an evenly distributed magnetic field may be obtained in space near the radiator L51 and radiator L52, achieving effect of current loop radiation.

In some embodiments, a length of the radiating branch of the current loop dipole antenna 21, namely, a total length of the radiator L51 and radiator L52, may be related to an operating band of the current loop dipole antenna. For example, the total length may be less than ½ of a corresponding operating wavelength of the operating band of the current loop dipole antenna 21 and greater than ¼ of the operating wavelength.

It should be noted that, in different embodiments, a relationship between a length of the radiator L51 and a length of the radiator L52 may be flexible. For example, the radiator L51 and radiator L52 may have a same size, or a length of the radiator L51 may be less than or greater than the length of the radiator L52. In this manner, a position of the capacitor C1 disposed between the radiator L51 and radiator L52 may also be flexible.

In the implementation shown in FIG. 25, the current loop dipole antenna 21 is used as the main antenna element, and the current loop dipole antenna 21 also includes a feed point P0. The feed point P0 is used to feed the radiating branch of the current loop dipole antenna 21.

In an implementation, a feeding form of the radiating branch of the current loop dipole antenna 21 is a direct feeding form. To be specific, the radiating branch of the current loop dipole antenna 21 is coupled to the feed point P0, and is used to generate a current by exciting the feed point P0, to perform radiation having a radiation characteristic of a current loop antenna. Specifically, as shown in FIG. 25 and FIG. 26A, opposite ends of the two radiators L51 and L52 of the radiating branch 211 of the current loop dipole antenna 21 are further coupled to the feed point P0 respectively.

Figure 26B:
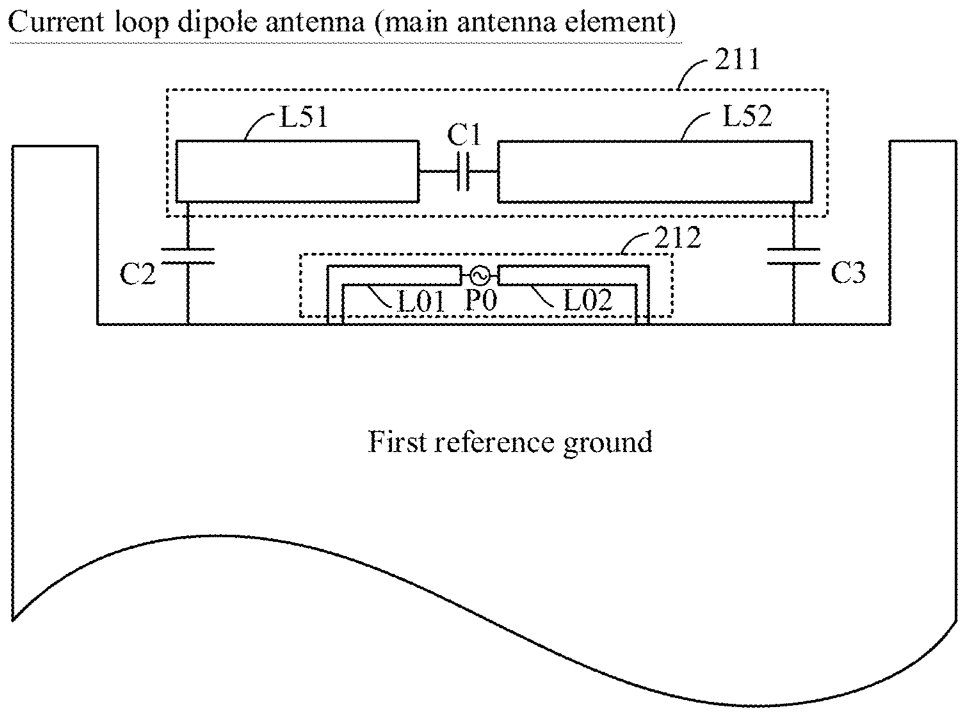
FIG. 26B is a schematic diagram of another planar structure of the current loop dipole antenna shown in FIG. 25.

In another implementation, a feeding form of the radiating branch 211 of the current loop dipole antenna 21 is a coupled feeding form. Specifically, as shown in FIG. 26B, the current loop dipole antenna 21 further includes a feed branch 212. The feed branch 212 and the radiating branch 211 are spaced apart. The feed branch 212 is disposed between the radiating branch 211 and the first reference ground 61. The feed point P0 is disposed on the feed branch 212. A structure and coupled feeding principle of the feed branch 212 shown in FIG. 26B are the same as a structure and coupled feeding principle of the feed branch 212 shown in FIG. 20B. For specific technical details, refer to detailed description of the feed branch 212 shown in FIG. 20B. The details are not described herein again.

Figure 26C:
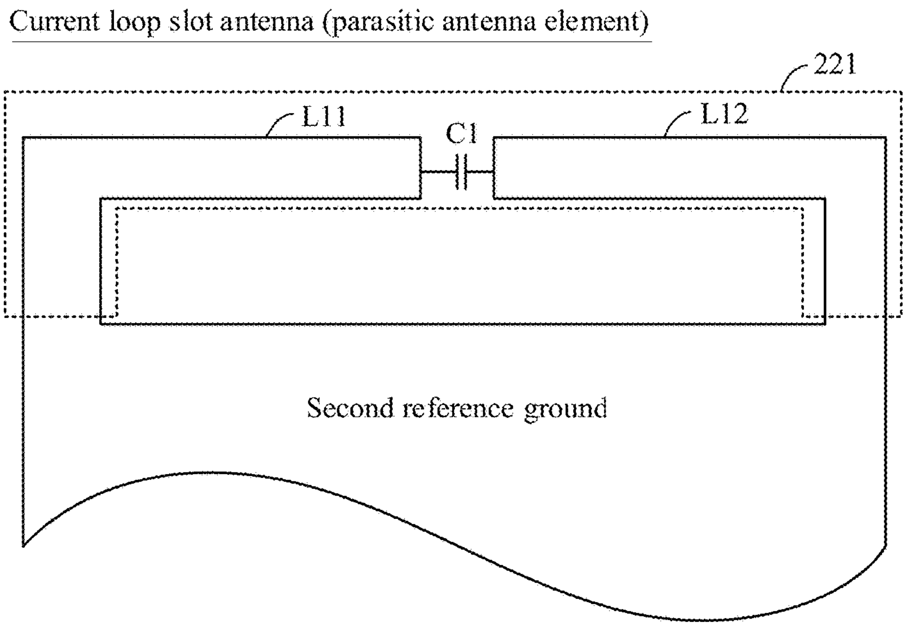
FIG. 26C is a schematic diagram of a planar structure of the current loop slot antenna shown in FIG. 25.

A structure of the current loop slot antenna 22 shown in FIG. 25 is similar to the structure of the current loop slot antenna 21 shown in FIG. 19. A difference is that the current loop slot antenna 22 shown in FIG. 25 is used as a parasitic antenna element. As shown in FIG. 26C, only a first capacitor C1 is disposed between the opposite ends of the two radiators L11 and L12 of the current loop slot antenna 22, and no feed point P0 is disposed.

For principles of magnetic field coupling performed between the current loop dipole antenna 21 and the current loop slot antenna 22 and radiation having a radiation characteristic of a current loop antenna, refer to detailed description of the main antenna element 21 and the parasitic antenna element 22 shown in FIG. 14. The details are not described herein again.

Figure 27:
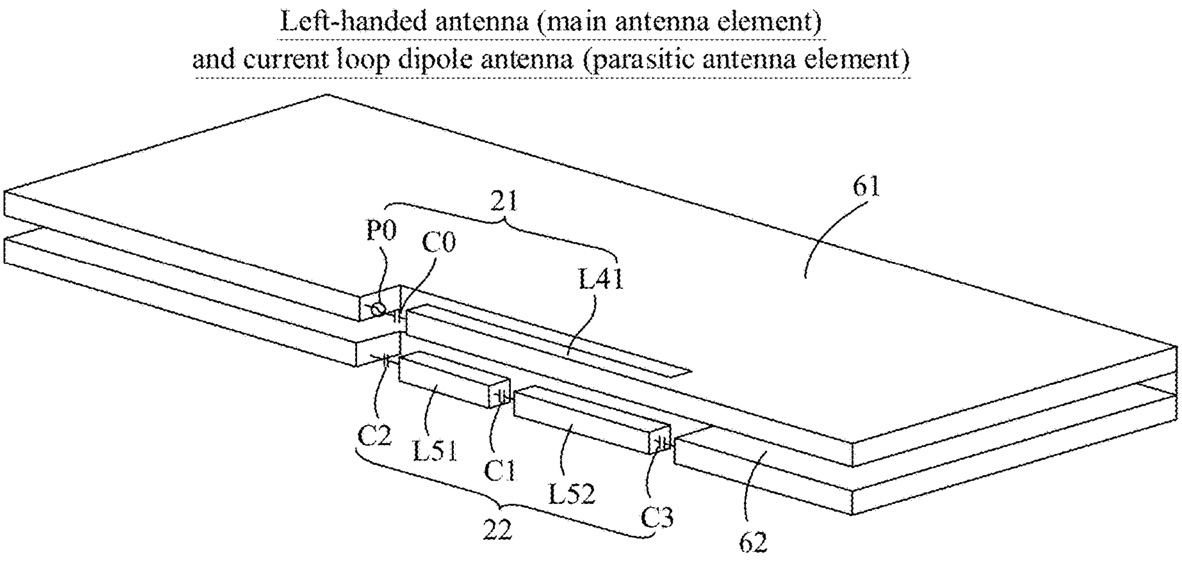
FIG. 27 is a schematic diagram of an equivalent structure of another combination form of an antenna structure according to an implementation of this application, where a main antenna element is a left-handed antenna, and a parasitic antenna element is a current loop dipole antenna.

In another implementation, as shown in FIG. 27, the main antenna element 21 is a left-handed antenna, and the parasitic antenna element 22 is a current loop dipole antenna.

A structure of the left-handed antenna 21 shown in FIG. 27 is similar to the structure of the left-handed antenna 22 shown in FIG. 23. A difference is that the current loop left-handed antenna 21 shown in FIG. 27 is used as the main antenna element, and the current loop left-handed antenna 21 further includes a feed point P0. The feed point P0 is used to feed a radiating branch of the left-handed antenna 21.

Figure 28A:
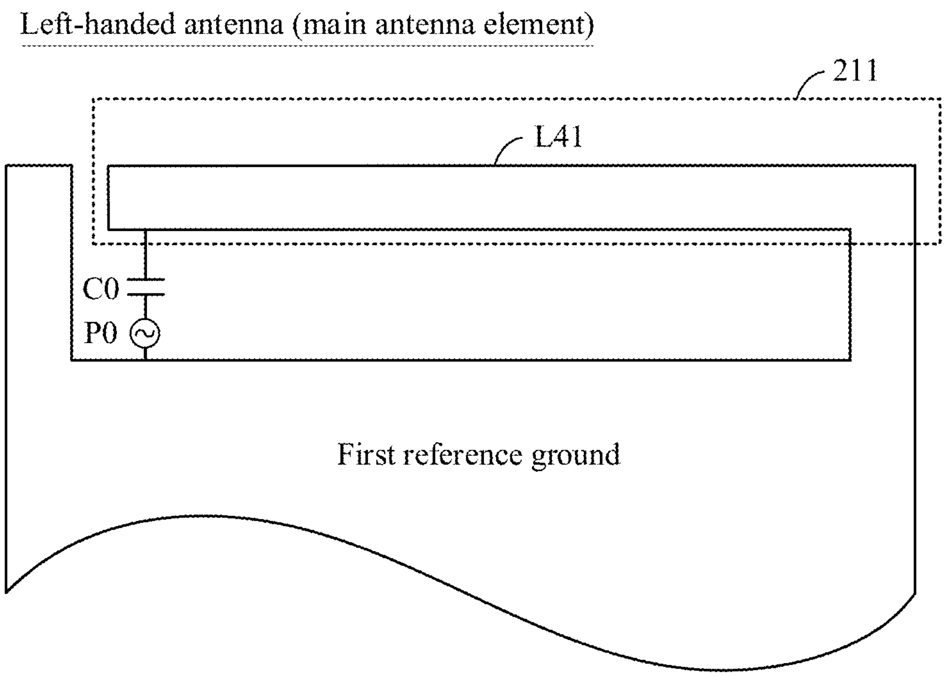
FIG. 28A is a schematic diagram of a planar structure of the left-handed antenna shown in FIG. 27.

In an implementation, a radiating branch of the left-handed antenna 21 is coupled to the feed point P0 and is used to generate a current by exciting the feed point P0, to perform radiation having a radiation characteristic of a current loop antenna. Specifically, as shown in FIG. 27 and FIG. 28A, one end of the radiator L41 of the radiating branch 211 of the left-handed antenna 21 is coupled to the feed point P0 through the fourth capacitor C0, and the other end of the radiator L41 of the radiating branch 211 of the left-handed antenna 21 is directly coupled to the first reference ground 61.

Figure 28B:
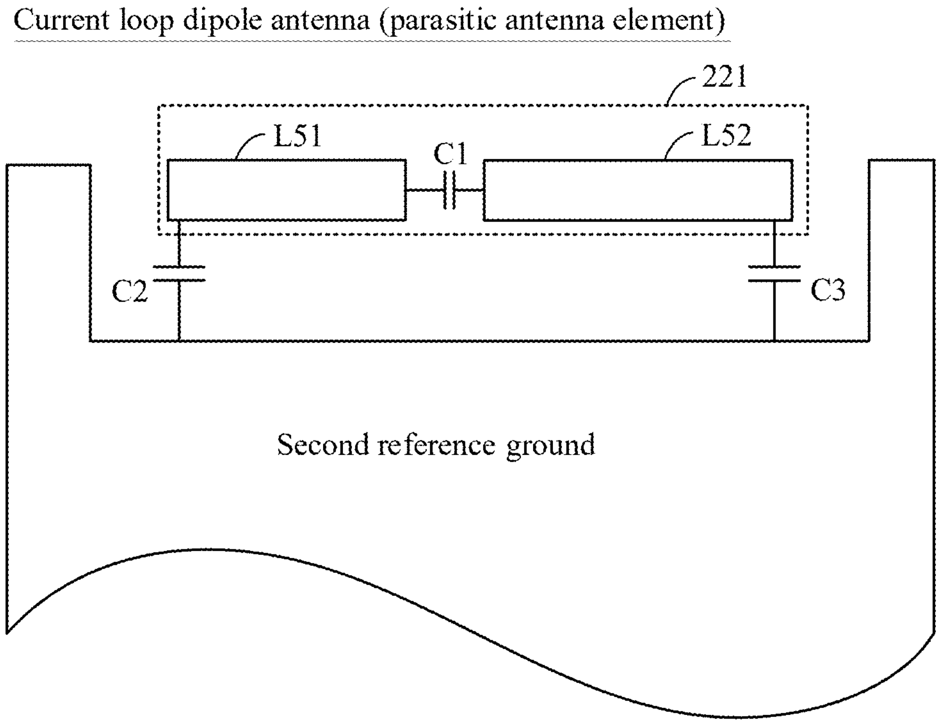
FIG. 28B is a schematic diagram of a planar structure of the current loop dipole antenna shown in FIG. 27.

A structure of the current loop dipole antenna 22 shown in FIG. 27 is similar to the structure of the current loop dipole antenna 21 shown in FIG. 25. A difference is that the current loop dipole antenna 22 shown in FIG. 27 is used as a parasitic antenna element. As shown in FIG. 28B, only a first capacitor C1 is disposed between opposite ends of two radiators L51 and L52 of the current loop dipole antenna 22, and no feed point P0 is disposed.

For principles of magnetic field coupling performed between the left-handed antenna 21 and the current loop dipole antenna 22 and radiation having a radiation characteristic of a current loop antenna, refer to detailed description of the main antenna element 21 and the parasitic antenna element 22 shown in FIG. 14. The details are not described herein again.

Figure 29:
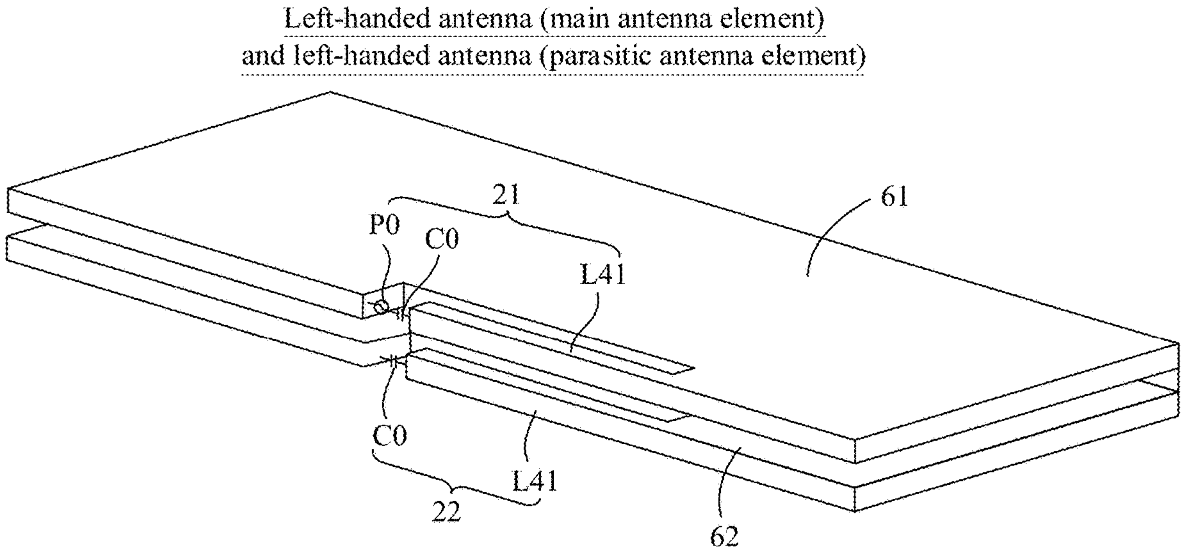
FIG. 29 is a schematic diagram of an equivalent structure of another combination form of an antenna structure according to an implementation of this application, where a main antenna element and a parasitic antenna element are both left-handed antennas.

In another implementation, as shown in FIG. 29, both the main antenna element 21 and the parasitic antenna element 22 are left-handed antennas. A structure of a left-handed antenna 21 shown in FIG. 29 is the same as the structure of the left-handed antenna 22 shown in FIG. 27. A structure of a left-handed antenna 22 shown in FIG. 29 is the same as the structure of the left-handed antenna 22 shown in FIG. 23. For technical details, refer to detailed description of the main antenna element 21 and the parasitic antenna element 22 shown in FIG. 14. The details are not described herein again.

As described above, based on various implementations of the main antenna element 21 and the parasitic antenna element 22 listed in FIG. 15, there are at least 25 combination forms of the main antenna element 21 and the parasitic antenna element 22. FIG. 14 and FIG. 19 to FIG. 29 show only structural schematic diagrams of 7 combinations. Examples of schematic diagrams of structures of various current loop antennas and left-handed antennas respectively used as the main antenna elements and as the parasitic antenna elements are used for illustration. Based on this, a person skilled in the art may easily understand and obtain a schematic diagram of a structure of another combination form not shown in the diagram in this application. Therefore, a schematic diagram of the another combination is not listed and described in this specification.

In the foregoing current loop antenna provided in this implementation of this application, as shown in FIG. 19, for example, one or more of the first capacitors C1 may be connected in series on the radiator. This enables magnetic field distribution obtained by exciting the current loop antenna to be more even, to achieve effect of increasing antenna radiation efficiency. A capacitance value of the first capacitor C1 connected in series on the radiator may be determined based on an operating band of a corresponding current loop antenna. For example, when the operating band of the current loop antenna is a low band (Low Band, LB), a range of the capacitance value of the first capacitor C1 connected in series on the radiator is [2 pF, 25 pF]. When the operating band of the current loop antenna is a mid band (Mid Band, MB), the range of the capacitance value of the first capacitor C1 connected in series on the radiator is [0.8 pF, 12 pF]. When the operating band of the current loop antenna is a high band (High Band, HB), the range of the capacitance value of the first capacitor C1 connected in series on the radiator is [0.2 pF, 8 pF].

The low band, middle band, and high band include but are not limited to a Bluetooth (Bluetooth, BT) communication technology, a global positioning system (global positioning system, GPS) communication technology, a wireless fidelity (Wireless Fidelity, Wi-Fi) communication technology, a global system for mobile communication (global system for mobile communication, GSM) communication technology, a wideband code division multiple access (wideband code division multiple access, WCDMA) communication technology, a long term evolution (long term evolution, LTE) communication technology, a 5G communication technology, a SUB-6G communication technology, other future communication technologies, and the like. The LB may be a band covering 450 MHz to 1 GHZ, the MB may be a band covering 1 GHZ to 3 GHZ, and the HB may be a band covering 3 GHz to 10 GHz, including 5G NR, Wi-Fi 6E, UWB, and other common bands.

In the current loop antenna provided in this implementation of this application, in specific design, for example, as shown in FIG. 21, at least one second capacitor C2 and/or third capacitor C3 may be disposed at ends of a radiator. Capacitance values of the second capacitor C2 and the third capacitor C3 that are disposed at ends may be determined based on an operating band of a corresponding current loop antenna. For example, when the operating band of the current loop antenna is the low band (Low Band, LB), a range of capacitance values of the second capacitor C2 and the third capacitor C3 that are disposed at ends of a radiator is [1.5 pF, 15 pF]. When the operating band of the current loop antenna is the mid band (Mid Band, MB), the range of the capacitance values of the second capacitor C2 and the third capacitor C3 that are disposed at ends of a radiator is [0.5 pF, 15 pF]. When the operating band of the current loop antenna is the high band (High Band, HB), the range of the capacitance values of the second capacitor C2 and the third capacitor C3 that are disposed at ends of a radiator is [1.2 pF, 12 pF].

It should be noted the examples of the value ranges of the capacitor are only used for illustration. The capacitance values of the capacitors may alternatively be flexibly set under different environments.

Figure 30:
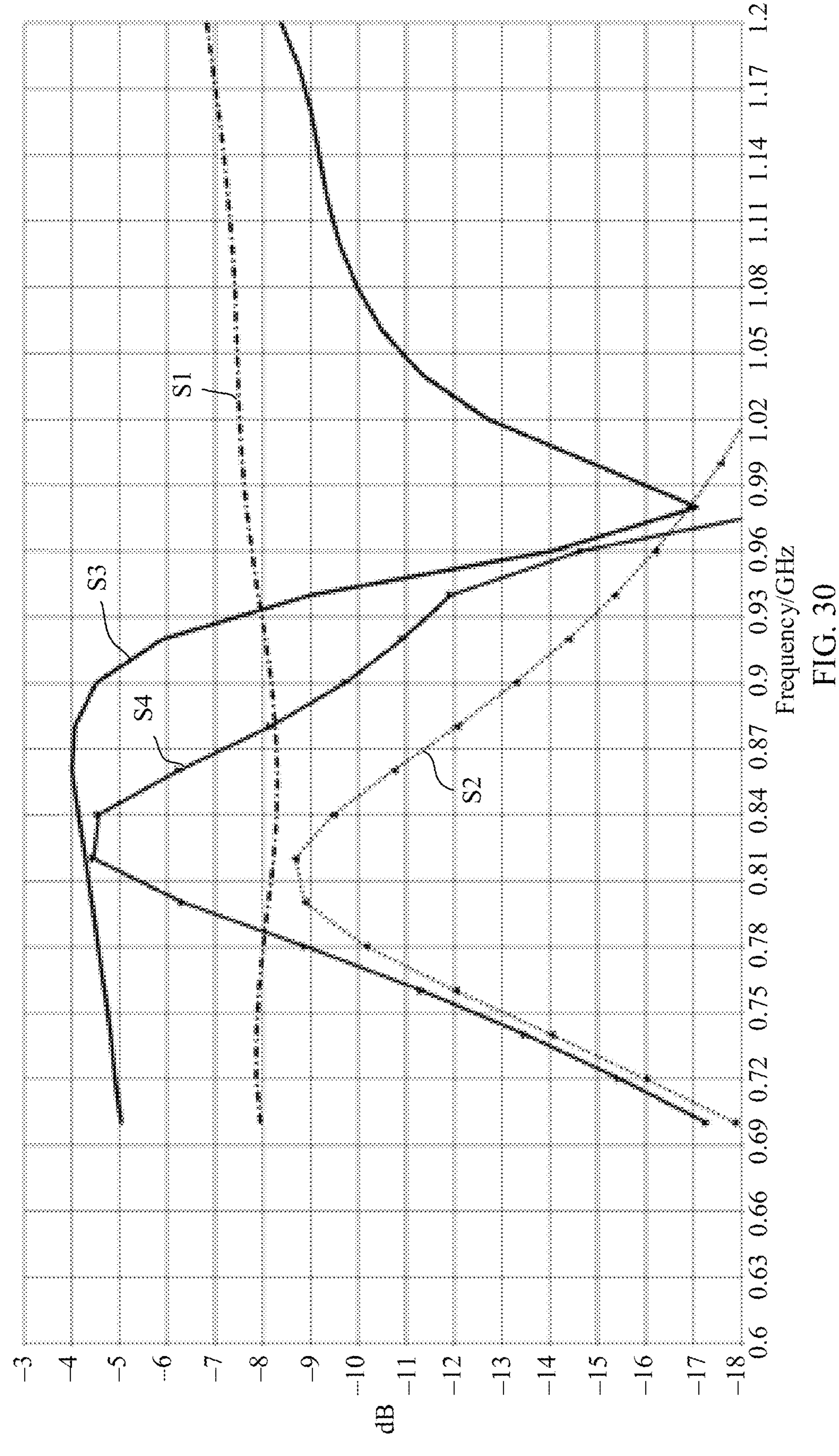
FIG. 30 is a schematic diagram of a simulated efficiency curve in the conventional antenna solution shown in FIG. 7 to FIG. 10 and a schematic diagram of a simulated efficiency curve in the antenna solution according to the implementation shown in FIG. 14.

FIG. 30 shows a schematic diagram of a simulated efficiency curve in a conventional antenna solution and a schematic diagram of a simulated efficiency curve in an antenna solution according to an implementation of this application. A curve S1 shown in FIG. 30 represents radiation efficiency corresponding to an ordinary left-handed antenna without a parasitic structure shown in FIG. 7 to FIG. 10 in the conventional antenna solution. A curve S2 represents system efficiency corresponding to an ordinary left-handed antenna without a parasitic structure shown in FIG. 7 to FIG. 10 in the conventional antenna solution. A curve S3 represents radiation efficiency corresponding to the main antenna element and the parasitic antenna element shown in FIG. 14 for which a solution of a current loop slot antenna is used. A curve S4 represents system efficiency corresponding to the main antenna element and the parasitic antenna element shown in FIG. 14 for which a solution of a current loop slot antenna is used.

Through comparison of the curve S1 and the curve S3, it may be learned that the antenna solution in which the current loop slot antenna for current loop radiation is used for both the main antenna element and the parasitic antenna element. Compared with the conventional antenna solution in which no parasitic structure is added to the ordinary left-handed antenna, the antenna radiation efficiency of the electronic device in the folded state is increased in the low band. For example, an average value of the antenna radiation efficiency in an LTE B5 (0.824 GHz to 0.894 GHZ) band is increased by approximately 4 dB.

Through comparison of the curve S2 and the curve S4, it may be learned that the antenna solution in which the current loop slot antenna for current loop radiation is used for both the main antenna element and the parasitic antenna element. Compared with the conventional antenna solution in which no parasitic structure is added to the ordinary left-handed antenna, the system efficiency of the electronic device in the folded state is increased in the low band. For example, an average value of the system efficiency in an LTE B5 (0.824 GHz to 0.894 GHZ) band is increased by approximately 4 dB to 5 dB.

Figure 31:
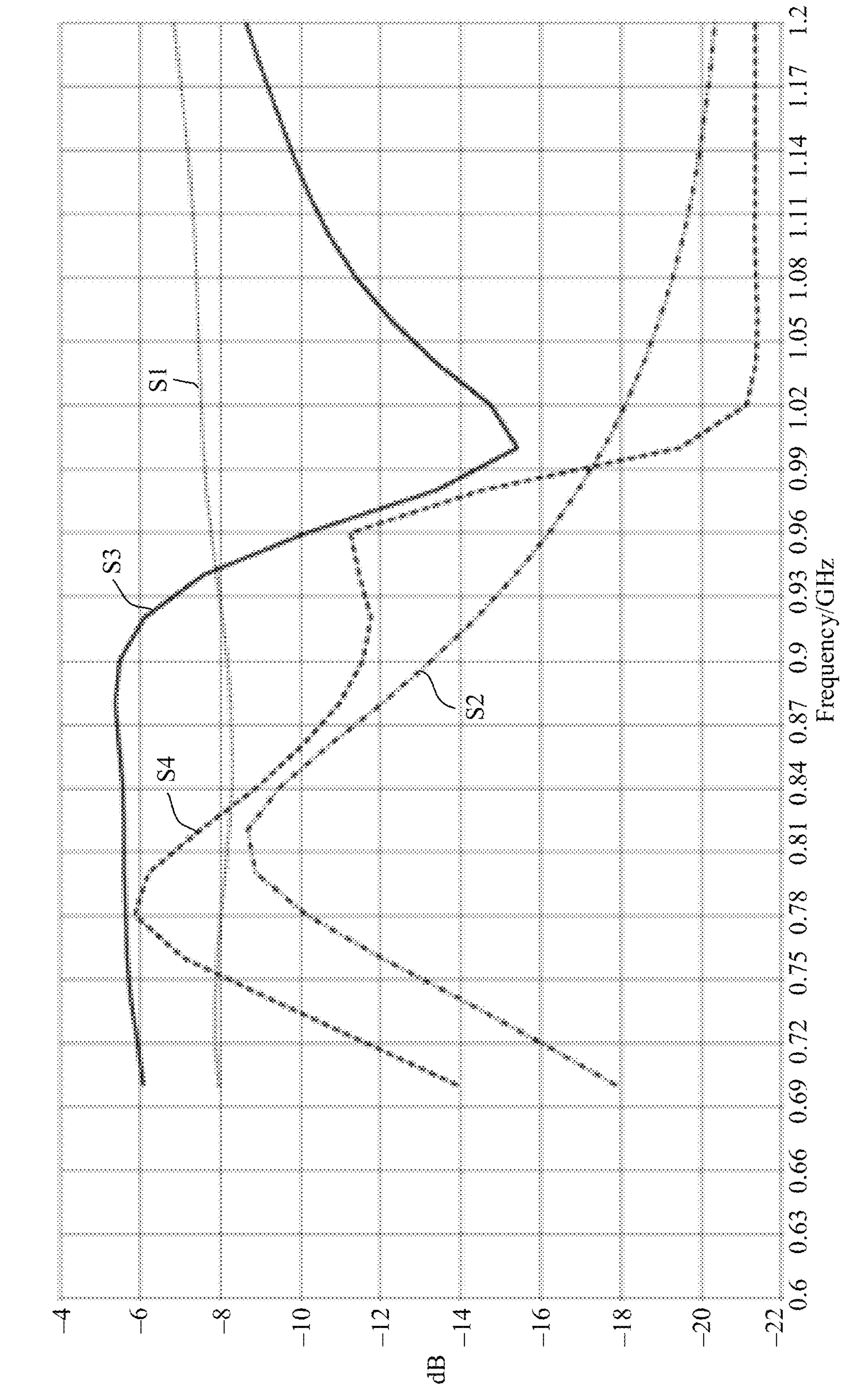
FIG. 31 is a schematic diagram of a simulated efficiency curve in the conventional antenna solution shown in FIG. 7 to FIG. 10 and a schematic diagram of a simulated efficiency curve in another antenna solution according to the implementation shown in FIG. 29.

FIG. 31 shows a schematic diagram of a simulated efficiency curve in a conventional antenna solution and a schematic diagram of a simulated efficiency curve in another antenna solution according to an implementation of this application. A curve S1 shown in FIG. 31 represents radiation efficiency corresponding to an ordinary left-handed antenna without a parasitic structure shown in FIG. 7 to FIG. 10 in the conventional antenna solution. A curve S2 represents system efficiency corresponding to an ordinary left-handed antenna without a parasitic structure shown in FIG. 7 to FIG. 10 in the conventional antenna solution. A curve S3 represents radiation efficiency corresponding to the main antenna element and the parasitic antenna element shown in FIG. 29 for which a solution of a left-handed antenna is used. A curve S4 represents system efficiency corresponding to the main antenna element and the parasitic antenna element shown in FIG. 29 for which a solution of a left-handed antenna is used.

Through comparison of the curve S1 and the curve S3, it may be learned that the antenna solution in which the left-handed antenna for current loop radiation is used for both the main antenna element and the parasitic antenna element. Compared with the conventional antenna solution in which no parasitic structure is added to the ordinary left-handed antenna, the antenna radiation efficiency of the electronic device in the folded state is increased in the low band. For example, an average value of the antenna radiation efficiency in an LTE B20 (0.791 GHz to 0.862 GHZ) band is increased by approximately 2.5 dB.

Through comparison of the curve S2 and the curve S4, it may be learned that the antenna solution in which the left-handed antenna for current loop radiation is used for both the main antenna element and the parasitic antenna element. Compared with the conventional antenna solution in which no parasitic structure is added to the ordinary left-handed antenna, the system efficiency of the electronic device in the folded state is increased in the low band. For example, an average value of the system efficiency in an LTE B20 (0.791 GHz to 0.862 GHz) band is increased by approximately 1 dB to 2 dB.

Based on FIG. 30 and FIG. 31, it may be learned that the antenna structure having the radiation characteristic of the current loop antenna is used for both the main antenna element and the parasitic antenna element. For example, in the case of the current loop antenna or the left-handed antenna, the antenna efficiency of the electronic device 100 in the folded state may be significantly increased.

In summary, in the foldable electronic device provided in this application, the main antenna element and the parasitic antenna element that are opposite to each other are disposed at the edge regions of the two foldable bodies, and the antenna structure having the radiation characteristic of a current loop antenna is used for both the main antenna element and the parasitic antenna element. In the folded state, through magnetic field coupling between the main antenna element and the parasitic antenna element, current loop radiation is formed on both the first radiating branch and the second radiating branch, and currents in a same direction are excited on the radiating branches of the two antenna elements. Based on a characteristic of the current loop radiation, longitudinal currents in a same direction may be excited simultaneously on two overlapping grounding plates of a foldable grounding plate of the electronic device. In this manner, in one aspect, a reverse transverse current generated on the foldable grounding plate in a gap mode in the folded state may be suppressed by using the longitudinal currents in the same direction on the two overlapping grounding plates, to achieve a purpose of suppressing excitation of the gap mode and reducing or eliminating energy consumed in the folded state, and further increase antenna efficiency in the folded state; in another aspect, excitation effect of the longitudinal mode of the foldable grounding plate is enhanced through superposition effect of the longitudinal currents in the same direction on the two overlapping grounding plates, to achieve a purpose of further increasing the antenna efficiency in the folded state, and enable the electronic device 100 to obtain better antenna performance in the folded state, effectively resolving a problem of poor antenna efficiency in a low band of the foldable electronic device 100 in the folded state.

The foregoing descriptions are merely some implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna system, applied to a foldable electronic device, wherein the foldable electronic device comprises a first body and a second body that are connected to each other and are capable of being folded or unfolded relative to each other; the antenna system comprises:

a main antenna element, comprising a feed point and a first radiating branch disposed on the first body, wherein the main antenna element is an antenna structure having a radiation characteristic of a current loop antenna, and the feed point is used to feed the first radiating branch; and a parasitic antenna element, comprising a second radiating branch disposed on the second body; and when the electronic device is in a folded state, the first radiating branch and the second radiating branch are at least partially overlapped, the first radiating branch is configured to perform magnetic field coupling with the second radiating branch, to form current loop radiation on both the first radiating branch and the second radiating branch, and a current direction in a current loop formed on the first radiating branch is the same as a current direction in a current loop formed on the second radiating branch, wherein the electronic device further comprises a first reference ground corresponding to the first body and a second reference ground corresponding to the second body; and when the electronic device is in the folded state, the main antenna element is configured to excite a closed current loop on the first radiating branch and the first reference ground, and is configured to perform magnetic field coupling with the parasitic antenna element, to excite a closed current loop on the second radiating branch and the second reference ground, wherein the current direction on the first radiating branch is the same as the current direction on the second radiating branch, the current direction on the first radiating branch is opposite to a current direction on the first reference ground, the current direction on the second radiating branch is opposite to a current direction on the second reference ground, and the current direction on the first reference ground is the same as the current direction on the second reference ground.

2. The antenna system according to claim 1, wherein the main antenna element and the parasitic antenna element are separately any one of a current loop slot antenna, a current loop monopole antenna, a current loop dipole antenna, a current loop left-handed antenna, and a left-handed antenna.

3. The antenna system according to claim 2, wherein the electronic device further comprises a connecting part disposed between the first body and the second body, and the first body and the second body are connected through the connecting part; and the first radiating branch is disposed at an edge, opposite to the connecting part, of the first body, and the second radiating branch is disposed at an edge, opposite to the connecting part, of the second body.

4. The antenna system according to claim 3, wherein the first radiating branch is disposed in a middle of the edge, opposite to the connecting part, of the first body, and the second radiating branch is disposed in a middle of the edge, opposite to the connecting part, of the second body.

5. The antenna system according to claim 1, wherein the first radiating branch is coupled to the feed point, and the first radiating branch is configured to generate a current by exciting the feed point, and perform radiation having a radiation characteristic of a current loop antenna; or the main antenna element further comprises a feed branch, the feed point is disposed on the feed branch, the feed branch and the first radiating branch are spaced apart, and the feed branch couples energy to the first radiating branch through electric field coupling/magnetic field coupling, to excite the first radiating branch to perform current loop radiation.

6. An antenna system, applied to a foldable electronic device, wherein the foldable electronic device comprises a first body and a second body that are connected to each other and are capable of being folded or unfolded relative to each other; the antenna system comprises:

a main antenna element, comprising a feed point and a first radiating branch disposed on the first body, wherein the main antenna element is an antenna structure having a radiation characteristic of a current loop antenna, and the feed point is used to feed the first radiating branch; and a parasitic antenna element, comprising a second radiating branch disposed on the second body; and when the electronic device is in a folded state, the first radiating branch and the second radiating branch are at least partially overlapped, the first radiating branch is configured to perform magnetic field coupling with the second radiating branch, to form current loop radiation on both the first radiating branch and the second radiating branch, and a current direction in a current loop formed on the first radiating branch is the same as a current direction in a current loop formed on the second radiating branch, wherein the main antenna element and/or the parasitic antenna element are/is a current loop slot antenna, and a radiating branch of the current loop slot antenna comprises two radiators with opposite ends, the opposite ends of the two radiators are coupled through a first capacitor, the other ends of the two radiators are respectively coupled to a corresponding reference ground, and a gap is formed between the two radiators and the reference ground; or the main antenna element and/or the parasitic antenna element are/is a current loop monopole antenna, a radiating branch of the current loop monopole antenna comprises one radiator, one end of the radiator is coupled to a corresponding reference ground or the feed point through a second capacitor, and the other end of the radiator is coupled to the corresponding reference ground through a third capacitor; and a length of the radiating branch of the current loop monopole antenna is less than a quarter of an operating wavelength of the current loop monopole antenna; or the main antenna element and/or the parasitic antenna element are/is a current loop dipole antenna, a radiating branch of the current loop dipole antenna comprises two radiators with opposite ends, the opposite ends of the two radiators are coupled through a first capacitor, the other end of one of the two radiators is coupled to a corresponding reference ground through a second capacitor, and the other end of the other of the two radiators is coupled to the corresponding reference ground through a third capacitor; and a length of the radiating branch of the current loop dipole antenna is less than half of an operating wavelength of the current loop dipole antenna; or the main antenna element and/or the parasitic antenna element are/is a current loop left-handed antenna, a radiating branch of the current loop left-handed antenna comprises two radiators with opposite ends, the opposite ends of the two radiators are coupled through a first capacitor, the other end of one of the two radiators is coupled to a corresponding reference ground or the feed point through a fourth capacitor, and the other end of the other of the two radiators is coupled to the corresponding reference ground; or the main antenna element and/or the parasitic antenna element are/is a left-handed antenna, a radiating branch of the left-handed antenna comprises one radiator, one end of the radiator is coupled to a corresponding reference ground or the feed point through a fourth capacitor, and the other end of the radiator is coupled to the corresponding reference ground.

7. The antenna system according to claim 6, wherein when an operating band of the main antenna element or the parasitic antenna element is 450 MHz to 1 GHz, a range of a capacitance value of the first capacitor is [2 pF, 25 pF];

when an operating band of the main antenna element or the parasitic antenna element is 1 GHz to 3 GHz, a range of a capacitance value of the first capacitor is [0.8 pF, 12 pF]; or when an operating band of the main antenna element or the parasitic antenna element is 3 GHz to 10 GHz, a range of a capacitance value of the first capacitor is [0.2 pF, 8 pF].

8. The antenna system according to claim 6, wherein when an operating band of the main antenna element or the parasitic antenna element is 450 MHz to 1 GHz, a range of capacitance values of the second capacitor and the third capacitor is [1.5 pF, 15 pF];

when an operating band of the main antenna element or the parasitic antenna element is 1 GHz to 3 GHz, a range of capacitance values of the second capacitor and the third capacitor is [0.5 pF, 15 pF]; or when an operating band of the main antenna element or the parasitic antenna element is 3 GHz to 10 GHz, a range of capacitance values of the second capacitor and the third capacitor is [1.2 pF, 12 pF].

9. An antenna system, applied to a foldable electronic device, wherein the foldable electronic device comprises a first body and a second body that are connected to each other and are capable of being folded or unfolded relative to each other, and the antenna system comprises:

a main antenna element, comprising a feed point and a first radiating branch disposed on the first body, wherein the feed point is used to feed the first radiating branch; and a parasitic antenna element, comprising a second radiating branch disposed on the second body; and wherein when the electronic device is in a folded state, the first radiating branch and the second radiating branch are at least partially overlapped, and the first radiating branch is configured to perform magnetic field coupling with the second radiating branch;

the main antenna element is any one of a current loop slot antenna, a current loop monopole antenna, a current loop dipole antenna, a current loop left-handed antenna, and a left-handed antenna;

the parasitic antenna element is any one of a current loop slot antenna, a current loop monopole antenna, a current loop dipole antenna, a current loop left-handed antenna, and a left-handed antenna;

for the current loop slot antenna, a radiating branch of the current loop slot antenna comprises two radiators with opposite ends, and the opposite ends of the two radiators are coupled through a first capacitor, the other ends of the two radiators are respectively coupled to a reference ground, and a gap is formed between the two radiators and the reference ground;

for the current loop monopole antenna, a radiating branch of the current loop monopole antenna comprises one radiator, one end of the radiator is coupled to a reference ground or the feed point through a second capacitor, and the other end of the radiator is coupled to the reference ground through a third capacitor; and a length of the radiating branch of the current loop monopole antenna is less than a quarter of an operating wavelength of the current loop monopole antenna;

for the current loop dipole antenna, a radiating branch of the current loop dipole antenna comprises two radiators with opposite ends, the opposite ends of the two radiators are coupled through a first capacitor, the other end of one of the two radiators is coupled to a reference ground through a second capacitor, and the other end of the other of the two radiators is coupled to the reference ground through a third capacitor; and a length of the radiating branch of the current loop dipole antenna is less than half of an operating wavelength of the current loop dipole antenna;

for the current loop left-handed antenna, a radiating branch of the current loop left-handed antenna comprises two radiators with opposite ends, the opposite ends of the two radiators are coupled through a first capacitor, the other end of one of the two radiators is coupled to a reference ground or the feed point through a fourth capacitor, and the other end of the other of the two radiators is coupled to the reference ground; and for the left-handed antenna, a radiating branch of the left-handed antenna comprises one radiator, one end of the radiator is coupled to a reference ground or the feed point through a fourth capacitor, and the other end of the radiator is coupled to the reference ground.

10. The antenna system according to claim 9, wherein when the current loop slot antenna is used as the main antenna element, the opposite ends of the two radiators are respectively coupled to the feed point; or the current loop slot antenna further comprises a feed branch, the feed branch and the radiating branch of the current loop slot antenna are spaced apart, the feed branch is disposed between the radiating branch of the current loop slot antenna and the reference ground, the feed point is disposed on the feed branch, and the feed branch is configured to perform coupled feeding on the radiating branch of the current loop slot antenna.

11. The antenna system according to claim 9, wherein when the current loop left-handed antenna is used as the main antenna element, the other end of one of the two radiators is coupled to the feed point through the fourth capacitor; or the current loop left-handed antenna further comprises a feed branch, the feed branch and the radiating branch of the current loop left-handed antenna are spaced apart, the feed branch is disposed between the radiating branch of the current loop left-handed antenna and the reference ground, the feed point is disposed on the feed branch, and the feed branch is configured to perform coupled feeding on the radiating branch of the current loop left-handed antenna.

12. The antenna system according to claim 9, wherein when the current loop monopole antenna is used as the main antenna element, the one end of the radiator is coupled to the feed point through the second capacitor; or the current loop monopole antenna further comprises a feed branch, the feed branch and the radiating branch of the current loop monopole antenna are spaced apart, the feed branch is disposed between the radiating branch of the current loop monopole antenna and the reference ground, the feed point is disposed on the feed branch, and the feed branch is configured to perform coupled feeding on the radiating branch of the current loop monopole antenna.

13. The antenna system according to claim 9, wherein when the current loop dipole antenna is used as the main antenna element, the opposite ends of the two radiators are respectively coupled to the feed point; or the current loop dipole antenna further comprises a feed branch, the feed branch and the radiating branch of the current loop dipole antenna are spaced apart, the feed branch is disposed between the radiating branch of the current loop dipole antenna and the reference ground, the feed point is disposed on the feed branch, and the feed branch is configured to perform coupled feeding on the radiating branch of the current loop dipole antenna.

14. The antenna system according to claim 9, wherein when the left-handed antenna is used as the main antenna element, the one end of the radiator is coupled to the feed point through the fourth capacitor.

15. The antenna system according to claim 9, wherein when an operating band of the main antenna element or the parasitic antenna element is 450 MHz to 1 GHZ, a range of a capacitance value of the first capacitor is [2 pF, 25 pF];

when an operating band of the main antenna element or the parasitic antenna element is 1 GHz to 3 GHz, a range of a capacitance value of the first capacitor is [0.8 pF, 12 pF]; or when an operating band of the main antenna element or the parasitic antenna element is 3 GHz to 10 GHz, a range of a capacitance value of the first capacitor is [0.2 pF, 8 pF].

16. The antenna system according to claim 9, wherein when an operating band of the main antenna element or the parasitic antenna element is 450 MHz to 1 GHz, a range of capacitance values of the second capacitor and the third capacitor is [1.5 pF, 15 pF];

when an operating band of the main antenna element or the parasitic antenna element is 1 GHz to 3 GHz, a range of capacitance values of the second capacitor and the third capacitor is [0.5 pF, 15 pF]; or when an operating band of the main antenna element or the parasitic antenna element is 3 GHz to 10 GHz, a range of capacitance values of the second capacitor and the third capacitor is [1.2 pF, 12 pF].

17. The antenna system according to claim 9, wherein the electronic device further comprises a connecting part disposed between the first body and the second body, and the first body and the second body are connected through the connecting part; and the first radiating branch is disposed at an edge, opposite to the connecting part, of the first body, and the second radiating branch is disposed at an edge, opposite to the connecting part, of the second body.

18. The antenna system according to claim 17, wherein the first radiating branch is disposed in a middle of the edge, opposite to the connecting part, of the first body, and the second radiating branch is disposed in a middle of the edge, opposite to the connecting part, of the second body.

19. A foldable electronic device, comprising:

a first body and a second body, wherein the first body and the second body are connected to each other and are capable of being folded or unfolded relative to each other; and the antenna system according to claim 1, wherein a main antenna element comprised in the antenna system is disposed on the first body, and a parasitic antenna element comprised in the antenna system is disposed on the second body.

* * * * *